United States Patent
Murata et al.

(10) Patent No.: US 10,273,668 B2
(45) Date of Patent: Apr. 30, 2019

(54) AUTOMATIC WATER FAUCET DEVICE

(71) Applicant: TOTO LTD., Kitakyushu-shi, Fukuoka (JP)

(72) Inventors: Kensuke Murata, Kitakyushu (JP); Hitoshi Nakao, Kitakyushu (JP); Naoto Tomiyama, Kitakyushu (JP); Tatsuya Fukutomi, Kitakyushu (JP); Masanobu Kanashiro, Kitakyushu (JP)

(73) Assignee: Toto Ltd., Kitakyushu-shi, Fukuoka (JP)

( * ) Notice: Subject to any disclaimer, the term of this patent is extended or adjusted under 35 U.S.C. 154(b) by 0 days.

(21) Appl. No.: 15/529,906

(22) PCT Filed: Nov. 20, 2015

(86) PCT No.: PCT/JP2015/082760
§ 371 (c)(1),
(2) Date: May 25, 2017

(87) PCT Pub. No.: WO2016/088586
PCT Pub. Date: Jun. 9, 2016

(65) Prior Publication Data
US 2017/0328046 A1 Nov. 16, 2017

(30) Foreign Application Priority Data

Dec. 2, 2014 (JP) .................................. 2014-244020
Mar. 5, 2015 (JP) .................................. 2015-043443

(51) Int. Cl.
*E03C 1/05* (2006.01)
*G01S 17/02* (2006.01)
(Continued)

(52) U.S. Cl.
CPC ............ *E03C 1/057* (2013.01); *G01S 17/026* (2013.01); *G01S 17/88* (2013.01); *G01V 8/20* (2013.01);
(Continued)

(58) Field of Classification Search
CPC .......... E03C 1/057; G01S 17/026; G01V 8/20
(Continued)

(56) References Cited

U.S. PATENT DOCUMENTS

| 5,945,068 A * | 8/1999 | Ferone | E03C 1/057 |
| | | | 134/102.3 |
| 2009/0188995 A1* | 7/2009 | Onodera | E03C 1/0404 |
| | | | 239/383 |
| 2017/0254055 A1* | 9/2017 | Xia | E03C 1/057 |

FOREIGN PATENT DOCUMENTS

| JP | H11-36387 A | 2/1999 |
| JP | 2002-316158 A | 10/2002 |
| JP | 2003-047565 A | 2/2003 |

\* cited by examiner

Primary Examiner — Huyen Le
(74) Attorney, Agent, or Firm — BakerHostetler

(57) ABSTRACT

An automatic water faucet device 1 for automatically discharging water when an object to be detected is detected has: a sensor 14 that detects the object; a first water discharge part 12 that performs foamy water discharge; a second water discharge part 13 that performs spray water discharge; and a controller 40 that performs control for switching between the foamy water discharge from the first water discharge part 12 and the spray water discharge from the second water discharge part 13, wherein the controller 40 performs the foamy water discharge from the first water discharge part 12 while the sensor 14 detects the object, and when the sensor 14 no longer detects the object, the controller 40 stops this (Continued)

foamy water discharge, and thereafter performs spray water discharge from the second water discharge part 13 for a predetermined period.

6 Claims, 20 Drawing Sheets

(51) Int. Cl.
*G01V 8/20* (2006.01)
*G01S 17/88* (2006.01)
E03C 1/00 (2006.01)
G01S 17/00 (2006.01)
G01V 8/00 (2006.01)

(52) U.S. Cl.
CPC ............ *E03C 1/00* (2013.01); *E03C 2201/40* (2013.01); *G01S 17/00* (2013.01); *G01V 8/00* (2013.01)

(58) Field of Classification Search
USPC .......................................................... 4/623
See application file for complete search history.

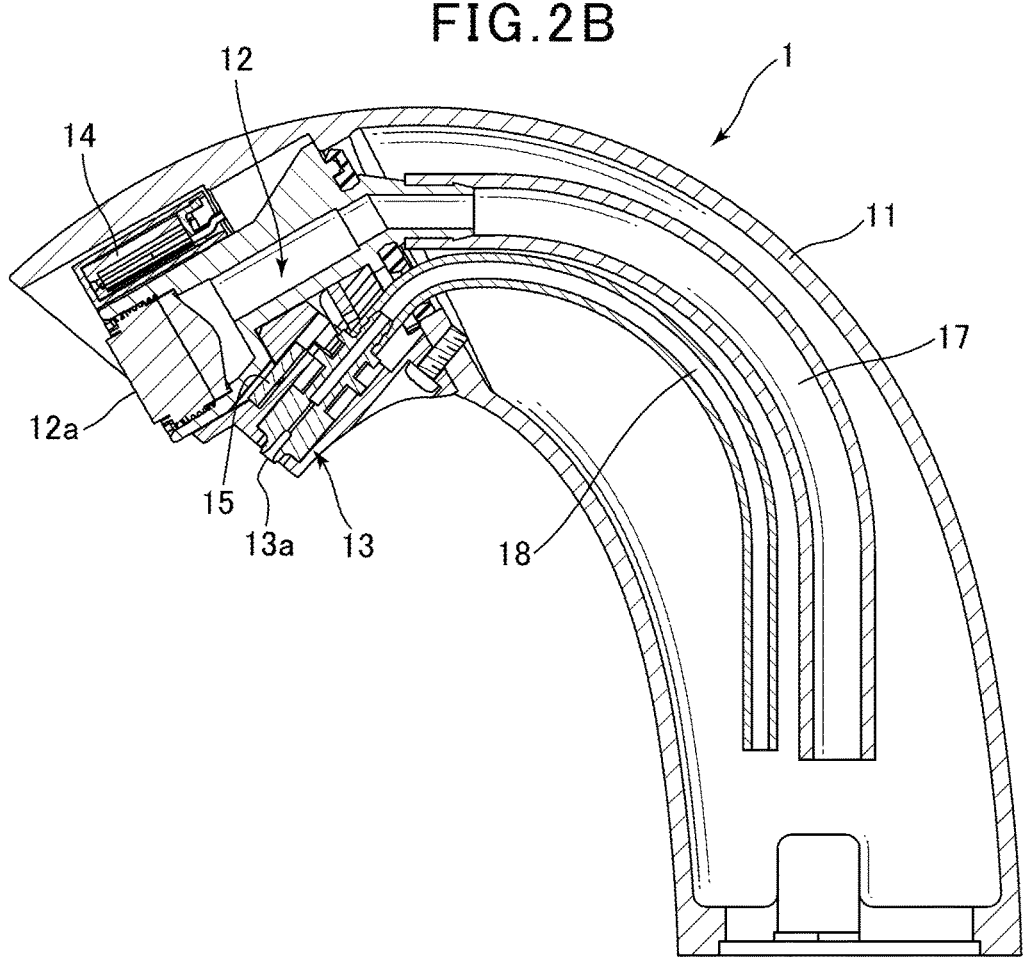

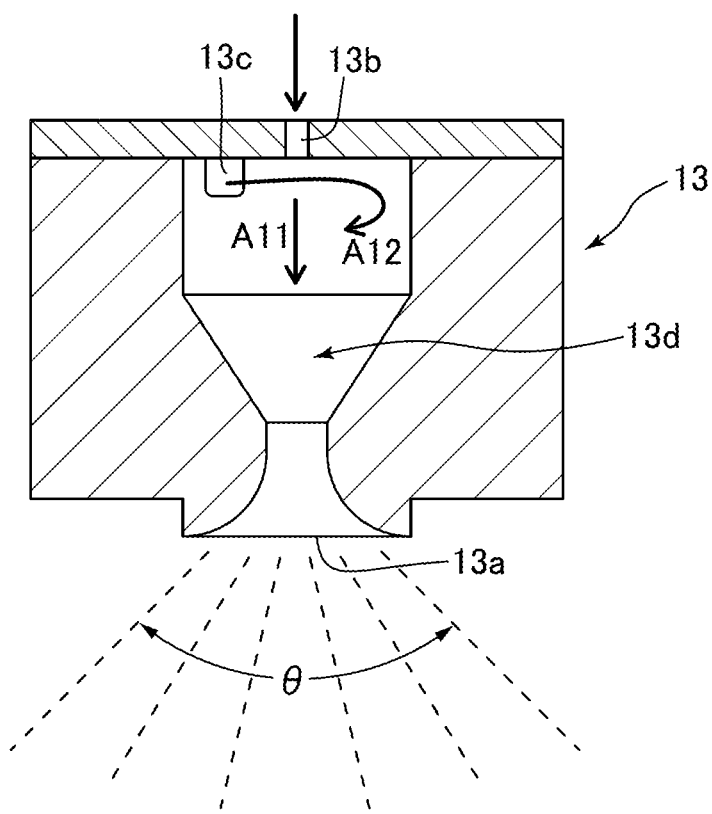

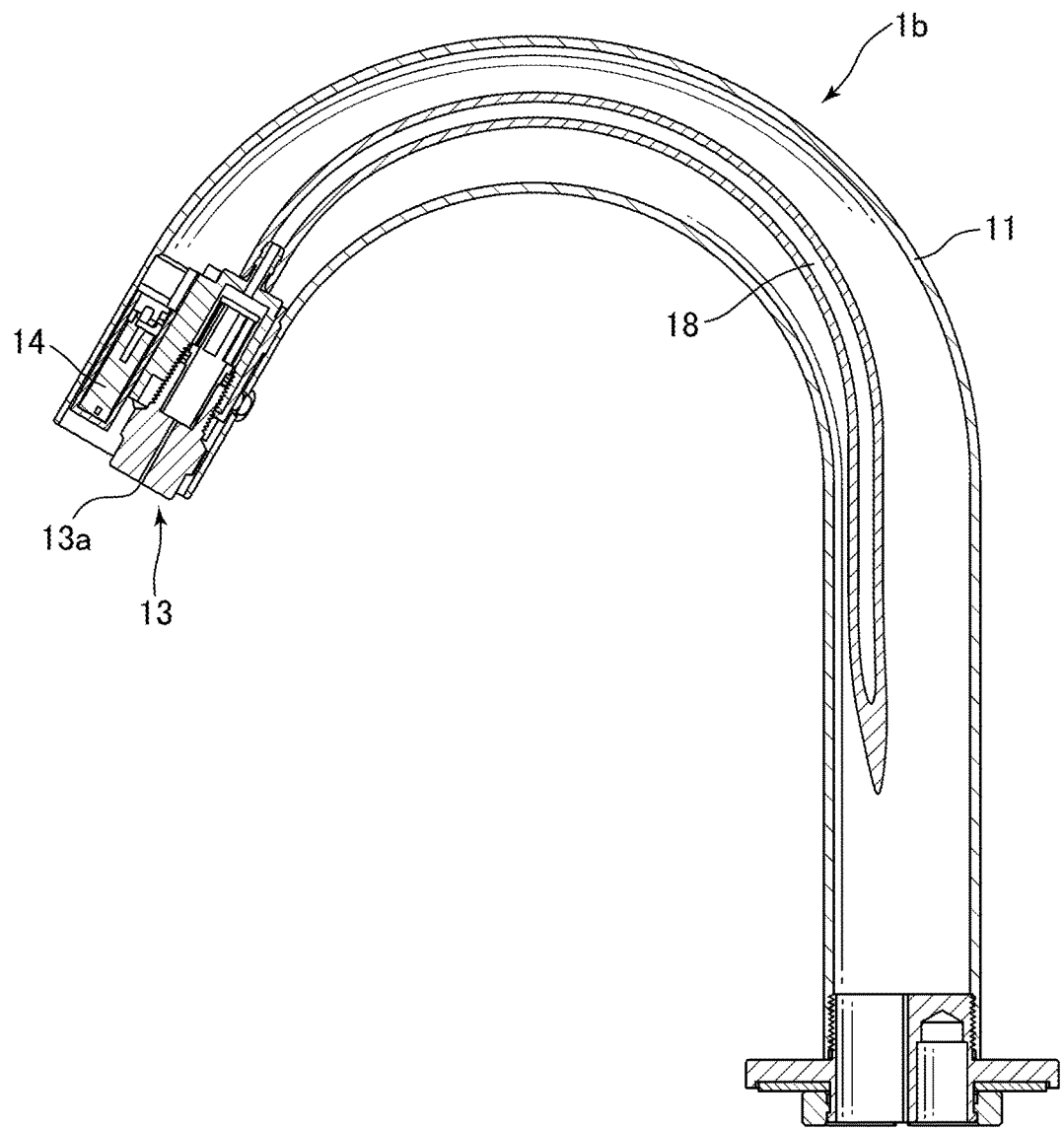

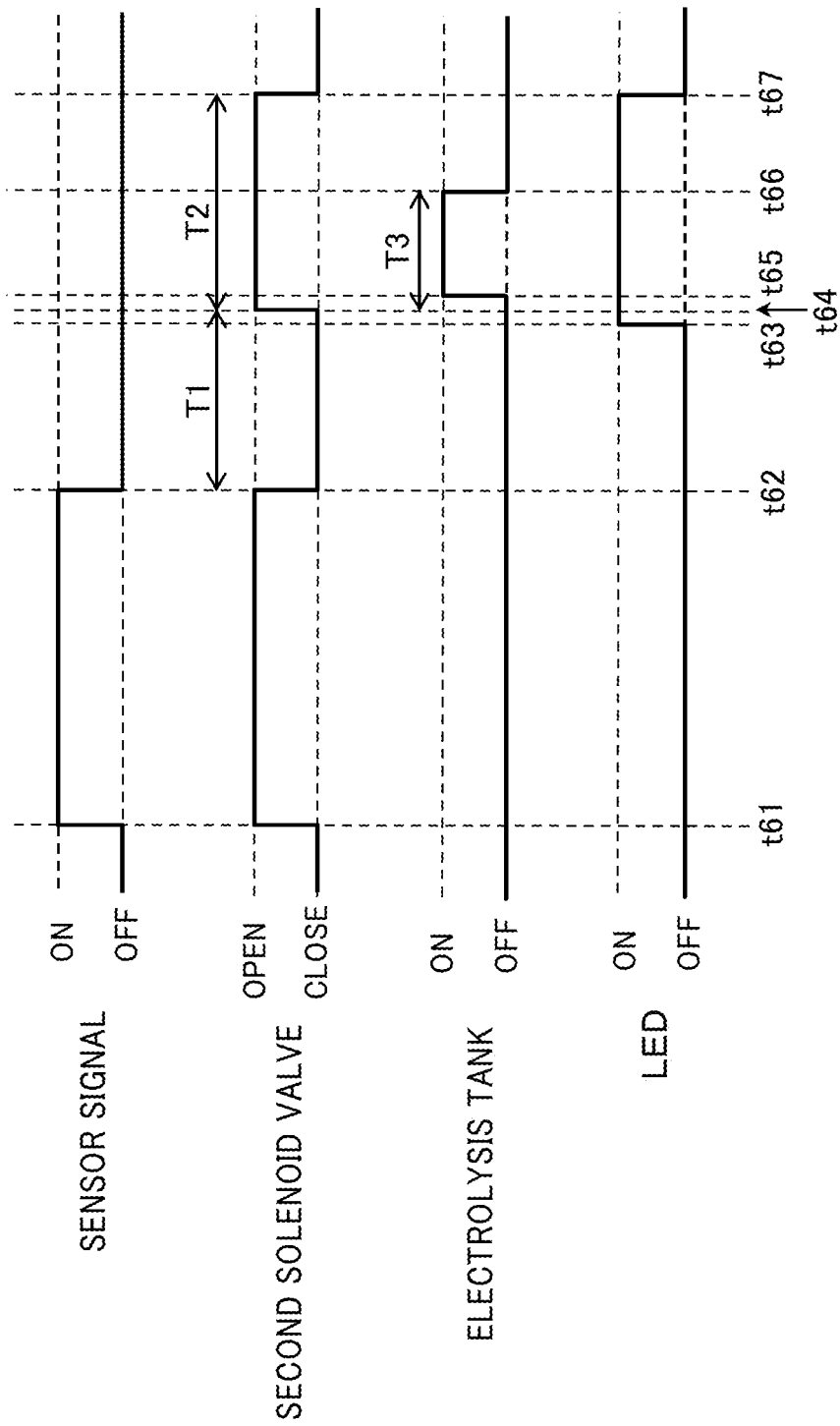

AUTOMATIC WATER FAUCET DEVICE

CROSS-REFERENCE TO RELATED APPLICATIONS

This application is a National Stage of International patent application PCT/JP2015/082760, filed on Nov. 20, 2015, which claims priority to foreign Japanese patent application Nos. JP 2014-244020, filed on Dec. 2, 2014 and JP 2015-043443, filed on Mar. 5, 2015, the disclosures of which are incorporated by reference in their entirety.

TECHNICAL FIELD

The present invention relates to an automatic water faucet device, particularly, to an automatic water faucet device that automatically performs water discharge and stop of the water discharge in accordance with a detection state of a sensor.

BACKGROUND ART

Conventionally, automatic water faucet devices that automatically discharge water when an object to be detected such as a human body is detected by a sensor are known (for example, refer to Patent Document 1). In a hand wash basin to which such an automatic water faucet device is applied, water (dirty water) containing dirt generated by hand washing flows in a bowl and a perforated plate, and when a period when water is not discharged from the automatic water faucet device (that is, a period when an object to be detected is not detected by a sensor) lasts long, such dirt is dried and stuck in a state of being adhered to the bowl and the perforated plate, and the dirt is hard to be removed. In order to prevent this, before the adhered dirt is dried and stuck, water should be discharged again. For example, Patent Document 2 proposes a technique in which existence of a human body is detected, and thereafter discharging water from a sink washing port for a fixed time after no human body is detected, to keep a sink clean and neat.

CITATION LIST

Patent Document

Patent Document 1: Japanese Patent Laid-Open No. 2014-43695
Patent Document 2: Japanese Patent Laid-Open No. 11-231

SUMMARY OF INVENTION

Technical Problem

However, in the technique described in Patent Document 2, even in a case where the water faucet device is not used previously, when a person leaves a cooking table (strictly, leaves a detection range of the sensor), water is discharged from the sink washing port, and unnecessary water discharge is performed. On the other hand, even in a case where the water faucet device is used previously, when a person stays around the cooking table (strictly, stays in the detection range of the sensor), water is not discharged from the sink washing port, and dirt is stuck and is hard to be removed.

Therefore, an object of the present invention is to provide an automatic water faucet device capable of suitably inhibiting dirt from being stuck to a bowl and the like to be hard to be removed while inhibiting unnecessary water discharge.

Solution to Problem

In order to attain the object, the present invention is an automatic water faucet device for automatically discharging water when an object to be detected is detected, the automatic water faucet device including: a sensor configured to detect the object; and a controller configured to perform a first water discharge while the sensor detects the object, and to perform a second water discharge while the sensor does not detect the object, wherein the controller is configured to perform the first water discharge while the sensor detects the object, and wherein, when the sensor no longer detects the object, the controller is configured to start the second water discharge, and to stop the second water discharge after stopping the first water discharge.

In the present invention thus configured, the first water discharge is performed while the sensor detects the object, and when the sensor no longer detects the object, the second water discharge is started, and the second water discharge is stopped after the first water discharge is stopped. Consequently, when there is a possibility that dirt flowing out by hand washing or the like is dried and stuck in a state of being adhered to a bowl and the like of a hand wash basin, such second water discharge can be suitably performed, and the dirt can be inhibited from being dried and stuck in the state of being adhered to the bowl and the like of the hand wash basin, while unnecessary water discharge is inhibited. Accordingly, it is possible to keep the bowl and the like of the hand wash basin clean.

Preferably, in the present invention, the controller is configured to perform control for switching between the first water discharge and the second water discharge, such that the first water discharge is performed while the sensor detects the object, and the first water discharge is stopped when the sensor no longer detects the object, and thereafter the second water discharge is performed for a predetermined period.

In the present invention thus configured, the control for switching between the first water discharge and the second water discharge is performed, the first water discharge is performed while the sensor detects the object, and when the sensor no longer detects the object, the first water discharge is stopped, and thereafter the second water discharge is performed for the predetermined period. Consequently, the second water discharge can be more suitably performed, and it is possible to keep the bowl and the like clean while inhibiting unnecessary water discharge.

Preferably, in the present invention, a water discharge form of the first water discharge and a water discharge form of the second water discharge are different from each other.

In the present invention thus configured, suitable water discharge forms are applied to the first water discharge and the second water discharge, so that it is possible to keep the bowl and the like clean while inhibiting unnecessary water discharge. The water discharge form of the first water discharge and the water discharge form of the second water discharge are thus made to be different from each other, so that a user can suitably grasp the water discharge performed while the sensor detects the object, and the water discharge performed while the sensor does not detect the object.

Preferably, in the present invention, in the first water discharge and the second water discharge, water is discharged from respective different water discharge parts.

In the present invention thus configured, the first water discharge and the second water discharge are performed from the respective suitable water discharge parts, so that it is possible to keep the bowl and the like clean while inhibiting unnecessary water discharge. Additionally, the first water discharge and the second water discharge are thus performed from the respective different water discharge parts, so that a user can suitably grasp the water discharge performed while the sensor detects the object, and the water discharge performed while the sensor does not detect the object.

Preferably, the present invention further includes: a first water discharge part configured to discharge water in a first water discharge form, and a second water discharge part configured to discharge water in a second water discharge form different from the first water discharge form, wherein the controller is configured to perform water discharge from the first water discharge part as the first water discharge, and to perform water discharge from the second water discharge part as the second water discharge, and to perform control for switching between the water discharge from the first water discharge part and the water discharge from the second water discharge part.

In the present invention thus configured, the respective suitable water discharge forms are applied to the first water discharge and the second water discharge, and the first water discharge and the second water discharge are performed from the respective suitable water discharge parts, so that it is possible to keep the bowl and the like clean while inhibiting unnecessary water discharge.

Preferably, in the present invention, a water discharge port of the first water discharge part and a water discharge port of the second water discharge part are provided in adjacent positions at a tip of the automatic water faucet device.

In the present invention thus configured, the water discharge port of the first water discharge part and the water discharge port of the second water discharge part are provided at the adjacent positions in the front end, and therefore water from the second water discharge part can be discharged in a water reaching range by hand washing utilizing the water discharge from the first water discharge part, and dirt flowing out by hand washing or the like can be suitably washed away by the water discharge from the second water discharge part.

Preferably, in the present invention, the controller is configured to perform the second water discharge after stop of the first water discharge, each time the first water discharge is performed.

In the present invention thus configured, after a user washes his/her hands or the like, the bowl and the like of the hand wash basin get dirty, and therefore the second water discharge is performed each time the first water discharge is performed, so that it is possible to keep the bowl and the like clean.

Preferably, the present invention preferably further includes a functional water generation part configured to operate by a supplied current, and to reform water so as to generate functional water, wherein the second water discharge part is configured to discharge the functional water generated by the functional water generation part.

In the present invention thus configured, water discharge from the second water discharge part is performed by use of the functional water, and therefore it is possible to effectively keep the bowl and the like of the hand wash basin clean.

Preferably, the present invention preferably further includes a solenoid valve configured to switch between execution and stop of water discharge from the second water discharge part, by opening and closing, wherein, when the water discharge from the second water discharge part is to be started, the controller is further configured to control the functional water generation part and the solenoid valve such that energization of the functional water generation part is started after the solenoid valve is opended.

In the present invention thus configured, when the water discharge from the second water discharge part is started, the functional water generation part starts being energized after start of energization of the solenoid valve, and the energization of the functional water generation part is started in a state where power is stable, and therefore it is possible to suitably handle a power supply having small capacity, and miniaturization of the device is possible.

Preferably, in the present invention, when the water discharge from the second water discharge part is to be terminated, the controller is configured to close the solenoid valve after the energization of the functional water generation part is stopped.

In the present invention thus configured, furthermore, also when water discharge from the second water discharge part is terminated, energization of the solenoid valve is stopped after stop of the energization of the functional water generation part, and the solenoid valve is operated from an open state to a closed state in a state where power is stable, and therefore it is possible to suitably handle a power supply having small capacity, and miniaturization of the device is possible.

Preferably, in the present invention, the controller is further configured to control the functional water generation part, and to learn a use frequency of the automatic water faucet device so as to adjust energizing time of the functional water generation part on the basis of the use frequency.

In the present invention thus configured, energizing time of the functional water generation part is adjusted on the basis of use frequency of the automatic water faucet device, for example, as the learned use frequency is increased, energizing time is shortened, so that it is possible to reduce load applied to the functional water generation part to increase the life (lifetime) of the functional water generation part.

Preferably, in the present invention, the controller is configured to perform the second water discharge each time the first water discharge is performed a predetermined number of times.

In the present invention thus configured, the second water discharge is not performed each time the first water discharge is performed, and the second water discharge is performed each time the first water discharge is performed the predetermined number of times, and therefore the number of times of the second water discharge is reduced, so that it is possible to save water.

Preferably, in the present invention, the controller is configured to perform the second water discharge, when a state where the sensor does not detect the object is continued for a predetermined time after the sensor no longer detects the object and the first water discharge is stopped.

In the present invention thus configured, the second water discharge is performed, when the state where the sensor does not detect the object is continued for the predetermined time after termination of the first water discharge, and therefore the user can be informed of the termination of the first water discharge and start of the second water discharge subsequent to the first water discharge. Therefore, for example, in a case where functional water is used as the second water discharge, when the functional water falls on hands of the user, skin roughness is sometimes caused depending on the concentration of functional water, or odor peculiar to functional water (such as odor of chlorine) sometimes remains. However, the user is thus informed of the start of the second water discharge, so that it is possible to suitably prevent a problem caused by falling of functional water on the hands of the user.

Preferably, in the present invention, when the sensor detects the object before the predetermined time elapses after stop of the first water discharge, the controller is configured to perform the first water discharge without performing the second water discharge.

In the present invention thus configured, in a case where the sensor detects the object during time before the second water discharge is started after termination of the first water discharge, the second water discharge is not performed, and the first water discharge is performed. Therefore, in a case where the sensor is switched from a temporal non-detection state to a detection state after the first water discharge (for example, in a case where the user temporarily moves his/her hands outside the detection range of the sensor during hand washing), the second water discharge is not started, and the first water discharge can be suitably started again. Therefore, the user can start washing his/her hands again without waiting for termination of the second water discharge.

Preferably, in the present invention, when the sensor detects the object during the second water discharge, the controller is configured to stop the second water discharge to perform the first water discharge.

In the present invention thus configured, in a case where the sensor detects the object during the second water discharge, the second water discharge is stopped, and the first water discharge is performed, and therefore the user can wash his/her hands without waiting for termination of the second water discharge.

Preferably, in the present invention, a discharge angle of water from a water discharge port in the second water discharge form by the second water discharge part is larger than a discharge angle of water from a water discharge port in the first water discharge form by the first water discharge part.

Water (dirty water) flowing out by hand washing using the water discharge from the first water discharge part tends to fall in a range wider than the water discharge range of the first water discharge part. However, according to the present invention thus configured, the water discharge from the second water discharge part having larger discharge angle of water from the water discharge port than the first water discharge part is used, and therefore water can be discharged in a wide range. Consequently, it is possible to effectively keep the bowl and the like of the hand wash basin clean.

Preferably, the present invention preferably further includes an illumination part configured to irradiate substantially the same range as a water discharge range by the second water discharge part, with light.

In a case where the above second water discharge form is applied, it is difficult for a user to anticipate the water discharge range of the second water discharge part. However, according to the present invention thus configured, the illumination part irradiates substantially the same water discharge range as the second water discharge part, and therefore the user can be suitably informed of the water discharge range of the second water discharge part, and water can be inhibited from reaching a place where the user does not desire.

Preferably, in the present invention, the illumination part is configured to start light irradiation before water discharge from the second water discharge part is started.

In the present invention thus configured, before the water discharge from the second water discharge part is started, the user is previously informed of the water discharge range of the second water discharge part by the light from the illumination part, and therefore water can be effectively inhibited from reaching the place where the user does not desire.

Advantageous Effects of Invention

According to the automatic water faucet device of the present invention, dirt can be suitably inhibited from being stuck to a bowl and the like to be hard to be removed while inhibiting unnecessary water discharge.

BRIEF DESCRIPTION OF DRAWINGS

FIGS. 2A and 2B are diagrams for specifically illustrating a configuration of the automatic water faucet device according to the embodiments of the present invention, in which FIG. 2A is a perspective view of this automatic water faucet device as viewed obliquely from below, and FIG. 2B is a sectional view of this automatic water faucet device taken along the line IIB-IIB in FIG. 2A.

FIG. 3 is a longitudinal sectional view of a second water discharge part for illustrating a principle of spray water discharge of the second water discharge part according to the embodiments of the present invention.

FIGS. 17A and 17B are diagrams for specifically illustrating a configuration of an automatic water faucet device according to Modification 5 in the embodiments of the present invention, in which FIG. 17A is a perspective view of this automatic water faucet device as viewed obliquely from below, and FIG. 17B is a sectional view of this automatic water faucet device taken along the line XVIIB-XVIIB in FIG. 17A.

FIG. 19 is a time chart illustrating control according to Modification 5 in the embodiments of the present invention.

DESCRIPTION OF EMBODIMENTS

Now, an automatic water faucet device according to embodiments of the present invention will be described with reference to the attached drawings.

<Whole Configuration>

Figure 1:
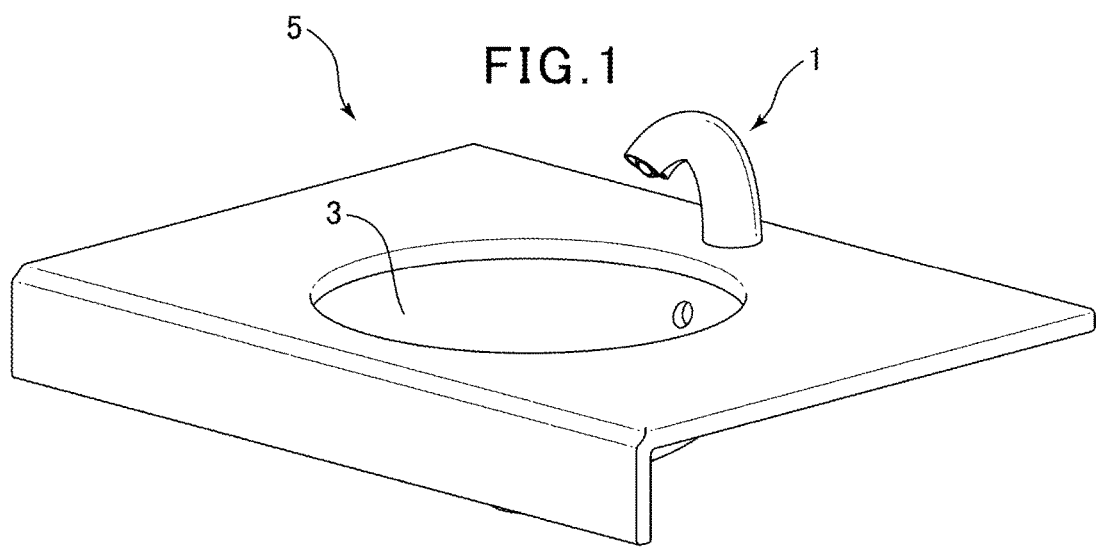
FIG. 1 is a perspective view of a hand wash basin, to which an automatic water faucet device according to embodiments of the present invention is applied, as viewed obliquely from above.

First, FIG. 1 is a perspective view of a hand wash basin, to which an automatic water faucet device according to the embodiments of the present invention is applied, as viewed obliquely from above. As illustrated in FIG. 1, a hand wash basin 5 has an automatic water faucet device 1 that automatically discharges water and stop discharging water in response to a detection state of an object such as a human body mainly, and a bowl 3 that receives water discharged from this automatic water faucet device 1, and drains the water from a drain port (not illustrated).

<Configuration of Automatic Water Faucet Device>

Now, the automatic water faucet device according to the embodiments of the present invention will be described in detail with reference to FIGS. 2A and 2B to FIG. 6.

Figure 2A:
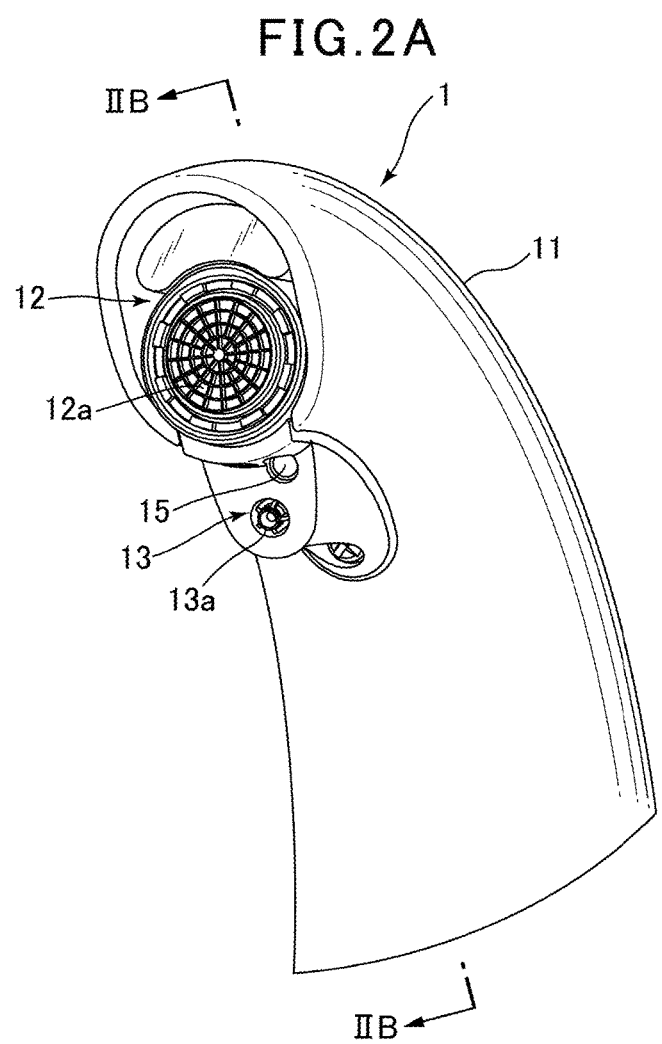

FIGS. 2A and 2B are diagrams for specifically illustrating a configuration of the automatic water faucet device according to the embodiments of the present invention. FIG. 2A is a perspective view of the automatic water faucet device according to the embodiments of the present invention as viewed obliquely from below, and FIG. 2B is a sectional view of this automatic water faucet device taken along the line IIB-IIB in FIG. 2A. Herein, a configuration of the vicinity of a water discharge part of the automatic water faucet device 1 according to the embodiments will be mainly described.

As illustrated in FIG. 2A, the automatic water faucet device 1 has a water discharge pipe 11 that is a curved tubular member. As illustrated in FIG. 2A and FIG. 2B, a first water discharge part 12 configured to perform foamy water discharge from a first water discharge port 12a, a nozzle-like second water discharge part 13 configured to perform spray water discharge (in other words, misty water discharge) from a second water discharge port 13a, and a sensor 14 that detects an object to be detected, and utilizes infrared light or the like, and an LED (Light Emitting Diode) 15 that applies light are disposed in a front end of the water discharge pipe 11. More specifically, in the front end of the water discharge pipe 11, the sensor 14, the first water discharge port 12a, the LED 15, and the second water discharge port 13a are disposed in this order from the top to the bottom. Additionally, a first flow path 17 that is connected to the first water discharge part 12, and supplies water to the first water discharge part 12, and a second flow path 18 that is connected to the second water discharge part 13, and supplies water to the second water discharge part 13 (including electrolyzed water described below) are disposed inside the water discharge pipe 11.

Herein, the first water discharge part 12 mixes air by a filter with water flow to be discharged and discharges foamy water containing foam in the water, as foamy water discharge. This foamy water discharge performed by the first water discharge part 12 is equivalent to a "first water discharge form" in the present invention. On the other hand, the second water discharge part 13 performs misty water discharge of widening water at a predetermined angle from the second water discharge port 13a, in other words, misty water discharge of widening water in a range wider than the cross-sectional area (diameter) of the second water discharge port 13a, as the spray water discharge. This spray water discharge by the second water discharge part 13 is equivalent to a "second water discharge form" in the present invention. Additionally, the second water discharge part 13 performs the spray water discharge at a smaller flow rate than the first water discharge part 12, and performs the spray water discharge at a faster flow speed than the first water discharge part 12. In one example, the first water discharge part 12 discharges foamy water at a speed of 2 liters per minute, and the second water discharge part 13 discharges splay water at a speed of 0.3 liters per minute.

Now, a principle of the spray water discharge of the second water discharge part 13 according to the embodiments will be described with reference to FIG. 3. FIG. 3 is a longitudinal sectional view of the second water discharge part 13 as viewed along the water flow direction.

As illustrated in FIG. 3, in the second water discharge part 13, a straight flow (refer to the arrow A11) is generated inside an internal flow path 13d by water that flows in from the inflow port 13b provided in an upper end, and a rotational flow (refer to the arrow A12) is generated inside the internal flow path 13d by water that flows in from a slit part 13c formed on an outer peripheral surface of the upper end of the internal flow path 13d. The spray water discharge is performed in a full-cone manner from the one second water discharge port 13a formed in a lower end of the internal flow path 13d, by a synergistic effect of such a straight flow and such a rotational flow. More specifically, the water is discharged while widening in a range larger than the cross-sectional area (diameter) of the second water discharge port 13a. In this case, the water is discharged while widening from the second water discharge port 13a at a discharge angle θ. In the foamy water discharge by the first water discharge section 12, water is discharged in almost the same range as the cross-sectional area (diameter) of the first water discharge port 12a, and therefore the discharge angle θ from the second water discharge port 13a of the second water discharge part 13 is larger than the discharge angle from the first water discharge port 12a of the first water discharge part 12.

Figure 4:
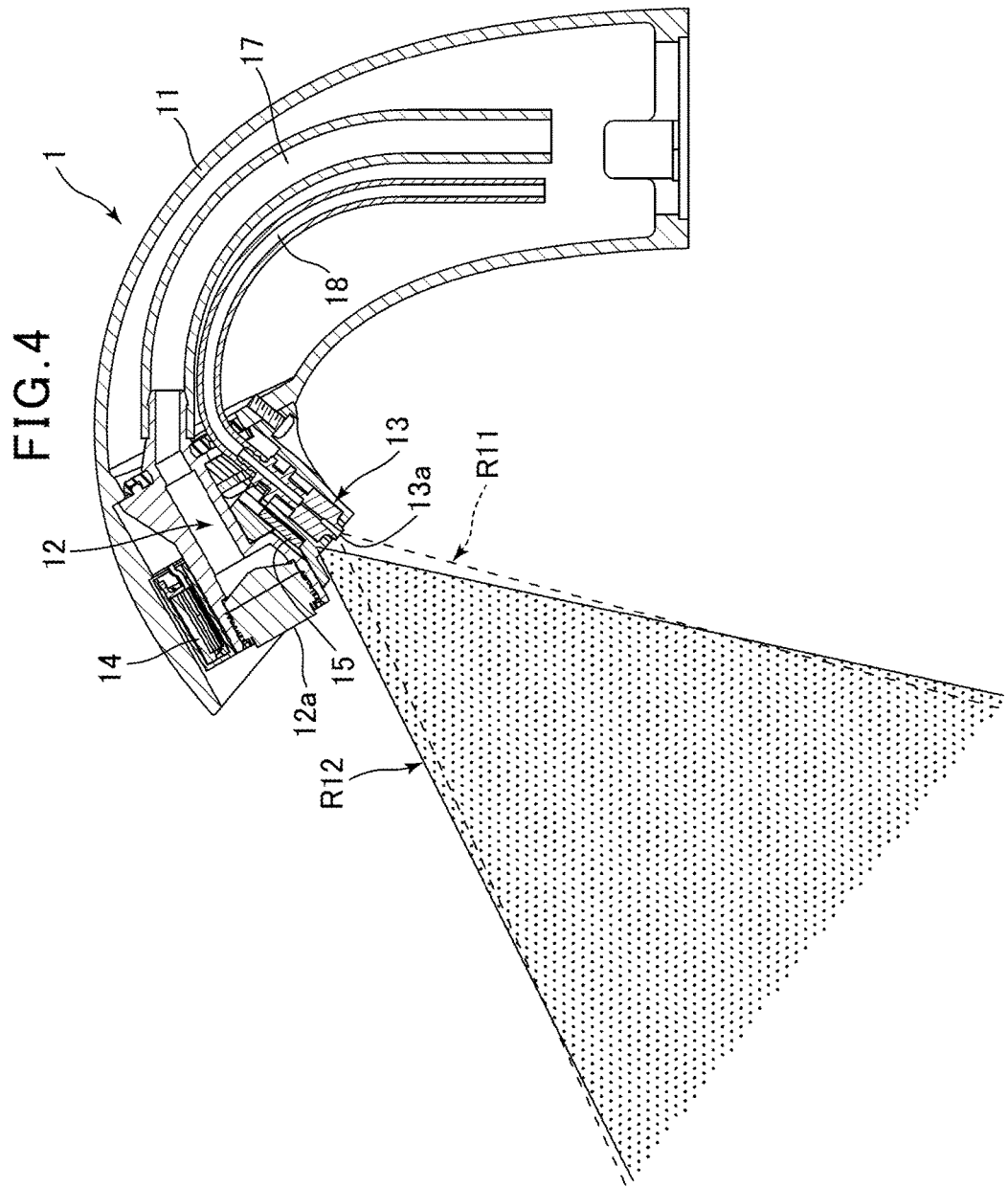
FIG. 4 is a sectional view of the automatic water faucet device according to the embodiments of the present invention, for illustrating relation between a water discharge range of the second water discharge part according to the embodiments of the present invention and an irradiation range of an LED.

Now, relation between the water discharge range of the second water discharge part 13 and the irradiation range of the LED 15 according to the embodiments will be described with reference to FIG. 4. FIG. 4 is a sectional view of the automatic water faucet device 1 according to the embodiments, which is similar to FIG. 2B.

As illustrated in FIG. 4, in the embodiments, in order to inform a user of a water discharge range R11 of water sprayed by the second water discharge part 13 by light from the LED 15, the installation angle of the LED 15 and the irradiation range of the LED 15 are set such that an irradiation range R12 of the light by the LED 15 substantially coincides with the water discharge range R11 by the second water discharge part 13. For example, the LED 15 is disposed such that the center axis of the LED 15 is substantially parallel to the center axis of the second water discharge part 13.

Figure 5:
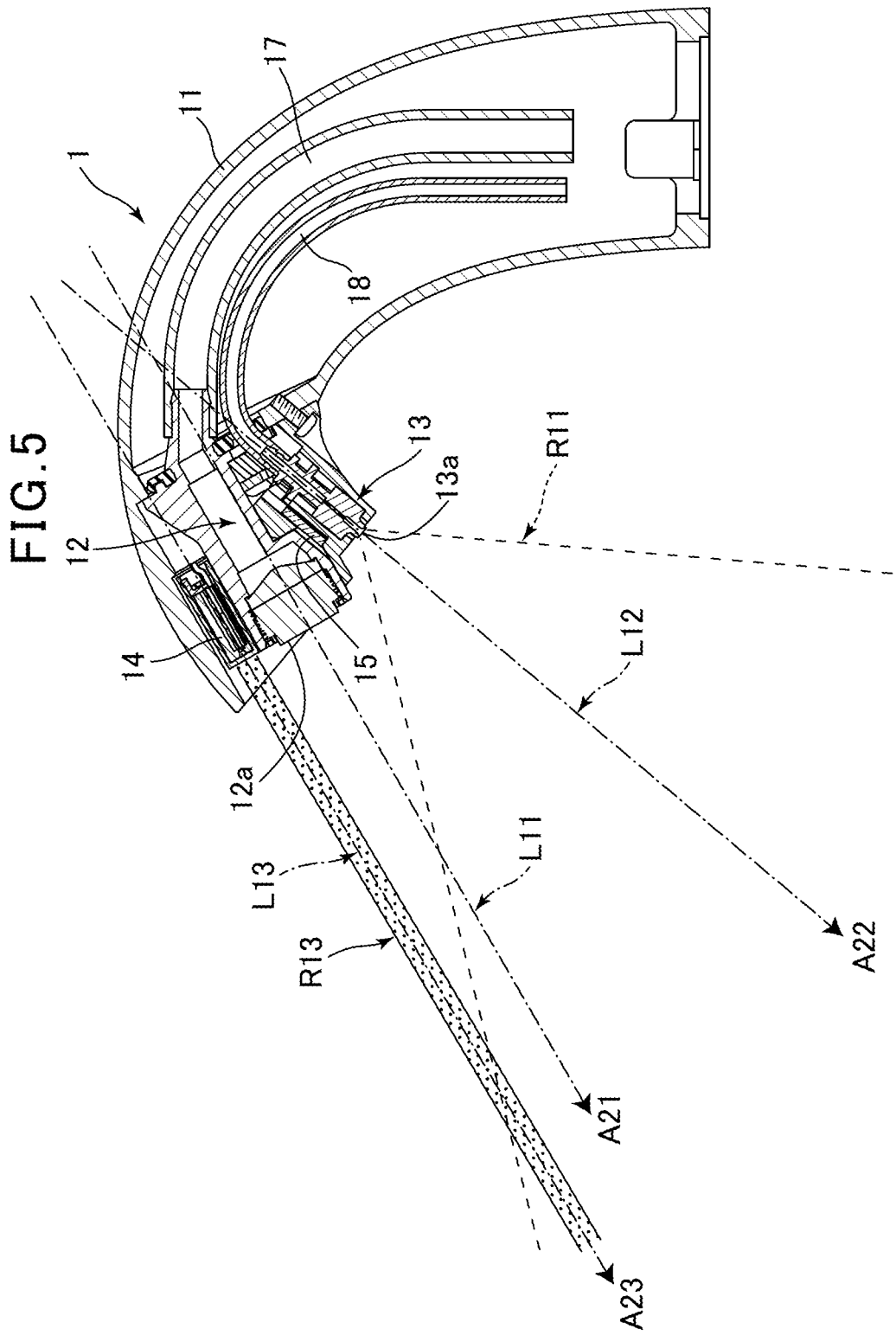
FIG. 5 is a sectional view of the automatic water faucet device according to the embodiments of the present invention, for illustrating placement relation among a first water discharge part and the second water discharge part, and a sensor according to the embodiments of the present invention.

Now, placement relation among the first water discharge part 12, the second water discharge part 13, and the sensor 14 according to the embodiments will be described with reference to FIG. 5. FIG. 5 is a sectional view of the automatic water faucet device 1 according to the embodiments, which is similar to FIG. 2B.

As illustrated in FIG. 5, in the embodiments, the second water discharge port 13a of the second water discharge part 13 is disposed behind the first water discharge port 12a of the first water discharge part 12, so that water dripping from the first water discharge port 12a is prevented from falling on the second water discharge port 13a. In this case, the second water discharge port 13a of the second water discharge part 13 is disposed such that water sprayed from the second water discharge port 13a does not fall on the first water discharge port 12a of the first water discharge part 12. In addition, the second water discharge port 13a of the second water discharge part 13 is disposed so as to perform spray water discharge toward the vicinity (not illustrated in FIG. 5) of a drain port of the bowl 3. In the embodiments, the sensor 14 is disposed in front of the second water discharge port 13a of the second water discharge part 13 such that a hand is suitably detected by the sensor 14 even when a person does not stretch his/her hands rearward. In other words, the second water discharge port 13a is disposed behind the sensor 14. Thus, the water sprayed from the second water discharge port 13a is unlikely to fall on a part not desired to be wet such as an arm and a body of the user.

Furthermore, in the embodiments, such directional relation between the sensor 14 and the second water discharge part 13 that the sensor 14 does not detect the water sprayed from the second water discharge port 13a of the second water discharge part 13 is employed. More specifically, the further the object to be detected is away from the sensor 14, the lower the detection accuracy of the sensor 14 becomes, and therefore such directional relation between the sensor 14 and the second water discharge part 13 that a directional range R13 (is a range including a detection range of the sensor 14, more specifically, is equivalent to a range in which the detection range is extended forward) corresponding to the detection direction A23 related to detection of the object to be detected in the sensor 14 intersects with the water discharge range R11 of the second water discharge part 13 at a separated position on the front side is employed. More specifically, the sensor 14 is disposed so as to be directed in such a direction that the detection direction A23 of the sensor 14 is separated from the water discharge direction A22 of the second water discharge part 13. In other words, the sensor 14 is disposed such that a line L13 (typically equivalent to the center axis of the sensor 14) along the detection direction A23 of the sensor 14 does not intersect with a line L12 (typically equivalent to the center axis of the second water discharge part 13) vertically extending from the center of the second water discharge port 13a of the second water discharge part 13 on the front side.

Furthermore, in the embodiments, such directional relation between the first water discharge part 12 and the second water discharge part 13 that the water sprayed from the second water discharge port 13a of the second water discharge part 13 is unlikely to fall on the user is employed. More specifically, the first water discharge part 12 and the second water discharge part 13 are disposed so as to be directed in such a direction that the water discharge direction A21 of the first water discharge part 12 and the water discharge direction A22 of the second water discharge part 13 are separated from each other. In other words, the first water discharge part 12 and the second water discharge part 13 are disposed such that a line L11 (typically equivalent to the center axis of the first water discharge part 12) vertically extending from the center of the first water discharge port 12a of the first water discharge part 12 does not intersect with the line L12 (typically equivalent to the center axis of the second water discharge part 13) vertically extending from the center of the second water discharge port 13a of the second water discharge part 13 on the front side.

Figure 6:
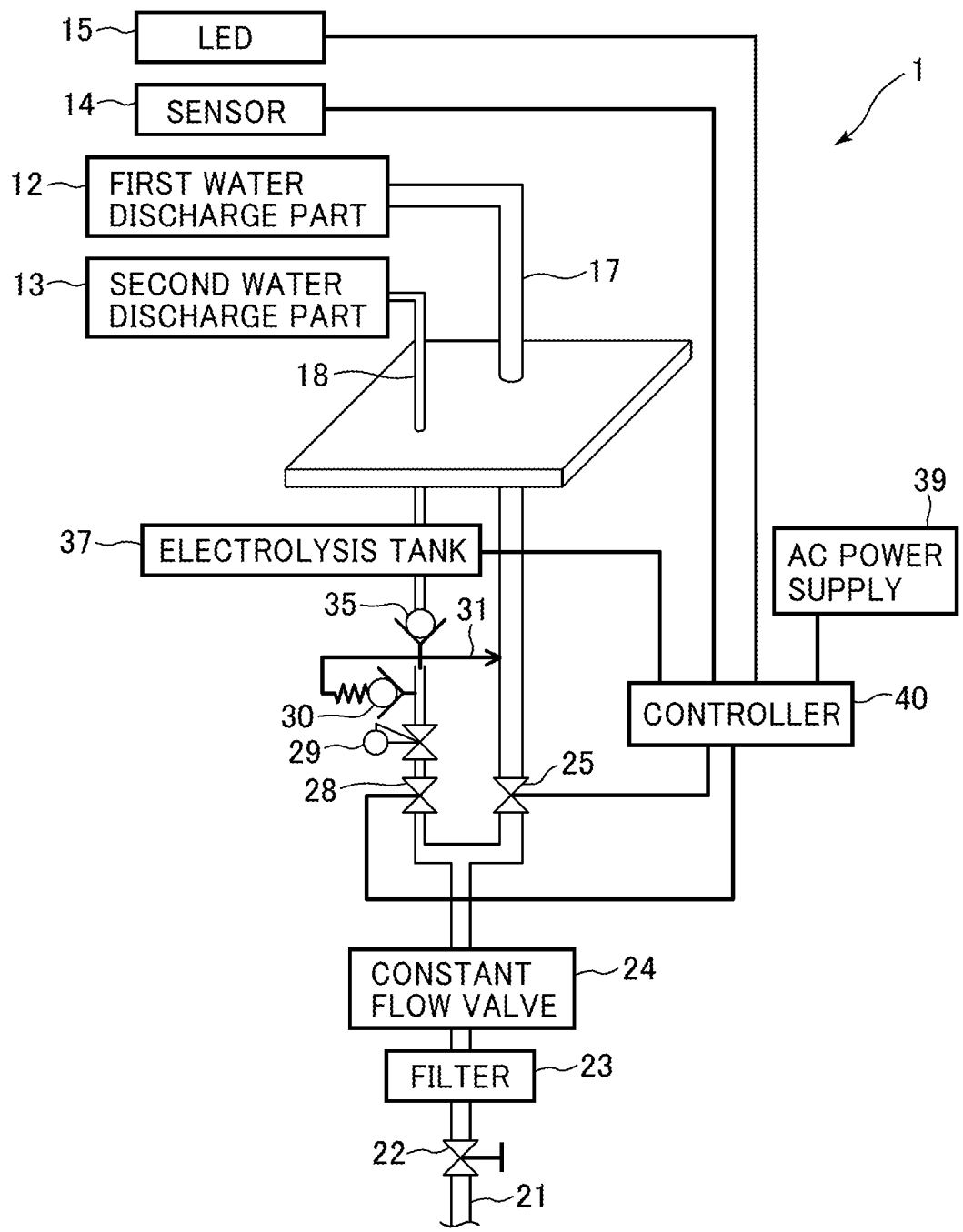
FIG. 6 is a block diagram schematically illustrating a function configuration of the automatic water faucet device according to the embodiments of the present invention.

Now, a function configuration of the automatic water faucet device according to the embodiments of the present invention will be described with reference to FIG. 6. FIG. 6 is a block diagram schematically illustrating the function configuration of the automatic water faucet device according to the embodiments of the present invention.

As illustrated in FIG. 6, in the automatic water faucet device 1 according to the embodiments, a common flow path 21 is connected to an upstream side of both the above first flow path 17 and second flow path 18 (refer to FIGS. 2A and 2B and the like). To this common flow path 21, normal water such as general tap water (city water) (this water is appropriately written as "normal water" in order to distinguish from electrolyzed water in this specification) is supplied. A stop cock 22 for blocking circulation of normal water in the common flow path 21, a filter 23 for removing foreign matters and the like mixed in normal water, and a constant flow valve 24 for keeping a flow rate on secondary side constant are provided on the common flow path 21 in order from the upstream side, and the common flow path 21 is branched into the first flow path 17 and the second flow path 18 at a downstream end of the common flow path 21.

A first solenoid valve 25 that switches between circulation and blocking of normal water in the first flow path 17 by opening and closing is provided in the first flow path 17. In a case where this first solenoid valve 25 is opened, normal water flows into the first flow path 17, and the normal water is foamily discharged from the first water discharge part 12 connected to the downstream end of the first flow path 17.

On the other hand, in the second flow path 18, a second solenoid valve 28, a pressure regulating valve 29, a safety valve 30, a check valve 35, and an electrolysis tank 37 are provided in order from the upstream side. The second solenoid valve 28 switches between the circulation and the blocking of normal water in the second flow path 18 by opening and closing. In a case where this second solenoid valve 28 is opened, normal water flows into the second flow path 18 to be sprayed from the second water discharge part 13 connected to a downstream end of the second flow path 18. The pressure regulating valve 29 is a valve that regulates water pressure to desired pressure (pressure suitable for performing the spray water discharge). The safety valve 30 is a valve that reduces the pressure of the inside of the second flow path 18 by opening to allow water inside the second flow path 18 to flow into the first flow path 17 through a bypass flow path 31 in a case where the pressure inside the second flow path 18 becomes predetermined pressure or more (for example, in a case where the second water discharge port 13*a* is closed and the pressure of the second flow path 18 rapidly rises). The check valve 35 is a valve that prevents backward flow of water. The electrolysis tank 37 electrolyzes normal water to generate electrolyzed water by being energized (this electrolysis tank 37 is equivalent to a "functional water generation part" in the present invention). A filter may be further provided on the downstream side of the electrolysis tank 37.

The automatic water faucet device 1 further has a controller 40 that controls components inside the automatic water faucet device 1. The controller 40 is operated by power from an AC power supply 39, and performs control for supplying the power of the AC power supply 39 to the sensor 14, the LED 15, the first solenoid valve 25, the second solenoid valve 28, and the electrolysis tank 37. More specifically, the controller 40 performs control for acquiring a sensor signal indicating a detection state of an object to be detected by the sensor 14, and switching between on and off of the LED 15 on the basis of this sensor signal, control for switching between opening and closing of the first solenoid valve 25, control for switching between opening and closing of the second solenoid valve 28, and control for switching between execution and stop of generation of electrolyzed water by the electrolysis tank 37.

Herein, electrolyzed water generated by the electrolysis tank 37 will be described.

As electrolyzed water used in the embodiments, any water having a disinfecting function obtained by electrolyzation may be used. Representative examples of electrolyzed water include electrolyzed water containing hypochlorous acid. Generally, tap water or recycled water contains chlorine ions and therefore free chlorine is generated by electrolyzation. Free chlorine which is acid exists as hypochlorous acid (HClO). In this form, free chlorine has higher sterilizing power by about 10 times than hypochlorous acid ions (ClO$^-$) whose existence form is alkaline. Additionally, even neutral, free chlorine obtains intermediate powerful sterilizing power. Accordingly, water electrolyzed in a continuous type electrolysis tank becomes sterile water having powerful sterilizing power.

As described above, tap water or recycled water generally utilized contains chlorine ions. However, in a case of utilization in a region where the concentration of chlorine ions is low, or in a case where powerful bactericidal action is needed, chloride such as salt is added, so that chlorine ions can be supplemented.

As an electrode used in chlorine generation, an electrode carrying a catalyst for generating chlorine in a conductive base material, or conductive material formed of a catalyst for generating chlorine is utilized. Examples of the electrode carrying a catalyst for generating chlorine include an iron-based electrode such as ferrite, a palladium-based electrode, a ruthenium-based electrode, an iridium-based electrode, a platinum-based electrode, a ruthenium-tin-based electrode, a palladium-platinum-based electrode, an iridium-platinum-based electrode, a ruthenium-platinum-based electrode, and an iridium-platinum-tantalum-based electrode, depending on kinds of a catalyst for generating chlorine. The electrode carrying the catalyst for generating chlorine in the conductive base material can be formed of a material such as titanium and stainless, and therefore is advantageous in a manufacturing cost.

In addition to chlorine, hypohalous acid obtained by electrolyzing water containing halogen ions may be used.

Examples of other electrolyzed water can include silver ion water obtained by utilizing silver as an electrode. Silver ions are absorbed by enzymes in cell membranes of bacteria, and block action of enzymes, and therefore it is said that bacteria cannot save their lives. Silver ions have action for coating a base material surface contacting with bacteria, and bacteria are unlikely to breed on the base material surface. Silver ions coat the base material surface, can prevent adhesion of bacteria, and have sterilizing power, and therefore it is possible to effectively inhibit breeding of bacteria on the base material surface. At this time, slime and an odor of a drain port can be inhibited for a long period by combination with a cleaning method for increasing a substitution ratio of a drain trap.

In addition to the above, various kinds of electrolyzed water such as ozonated water of generating ozone with high concentration along with generation of oxygen on an anode side by particularly using lead dioxide (β type) as an electrode for electrolyzation can be suitably used.

Furthermore, examples of disinfected water other than electrolyzed water include solution containing various dissolved disinfection components. As dissolved disinfection components, any of solid, liquid, and gaseous disinfection components may be used. In a case where a liquid disinfection component is used, for example, alcohols such as ethanol and isopropanol, hydrogen peroxide, or the like may be applied. Additionally, in a case where a gaseous disinfection component is used, for example, ozonated water may be produced by dissolving ozone as microbubble into water. In a case where a solid disinfection component is used, for example, sodium hypochlorite or the like may be applied.

Various kinds of disinfected water described above are equivalent to "functional water" in the present invention. Herein, in this specification, word "disinfection" means not only reduction of bacteria (in this case, not only meaning of reduction of bacteria by removal, but also meaning of reduction of bacteria by killing are included), but also inhibition of breeding of bacteria in default of reduction of bacteria, is used as broad sense. The "functional water" in the present invention means water obtained by adding a disinfecting function having such meaning to normal water by predetermined treatment.

In the embodiments, an example in which electrolyzed water is used as the functional water in the present invention will be described. It goes without saying that the above disinfected water other than electrolyzed water may be used in place of electrolyzed water.

<Control by Controller>

Now, control performed by the controller 40 in the embodiments of the present invention will be specifically described.

First Embodiment

First, control performed by the controller 40 in a first embodiment of the present invention will be described.

Figure 7:
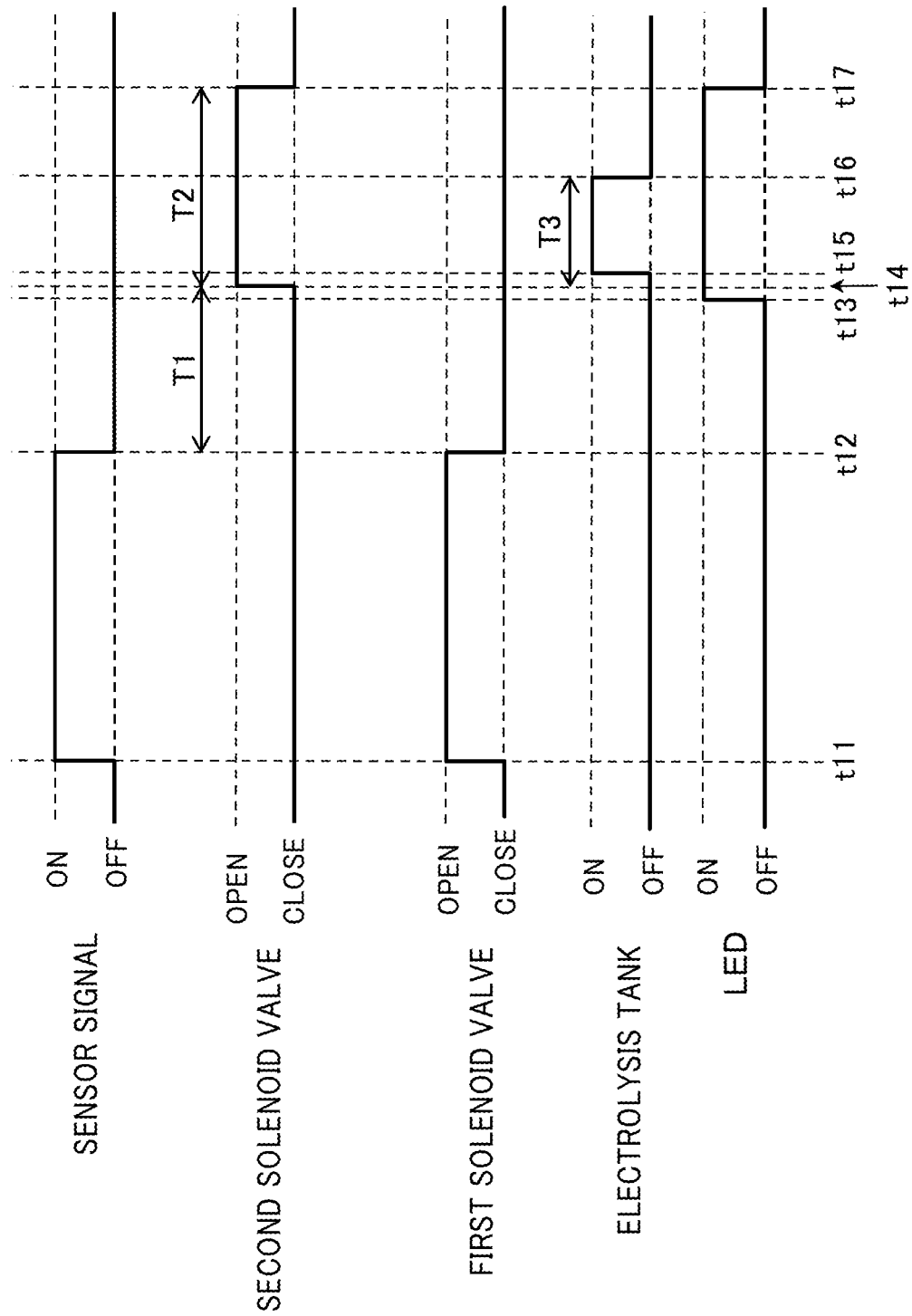
FIG. 7 is a time chart illustrating basic control according to a first embodiment of the present invention.
Figure 8:
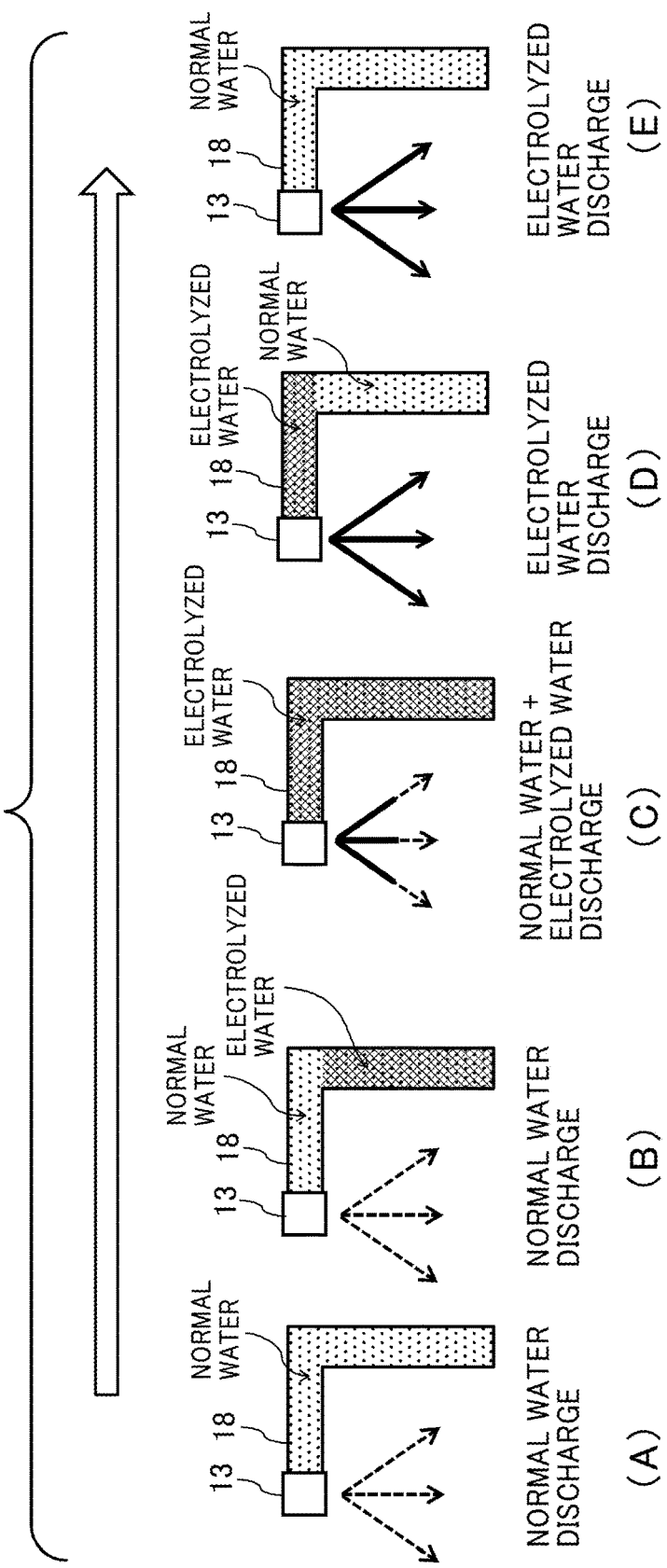
FIGS. 8A-8E are schematic diagrams illustrating a state of water inside a second flow path in a period of after-water discharge in time series from the left to the right, according to the first embodiment of the present invention.

FIG. 7 is a time chart illustrating basic control according to the first embodiment of the present invention. FIG. 7 illustrates a sensor signal supplied to the controller 40 from the sensor 14, a driving signal supplied to the second solenoid valve 28 from the controller 40, a driving signal supplied to the first solenoid valve 25 from the controller 40, a driving signal supplied to the electrolysis tank 37 from the controller 40, and a driving signal supplied to the LED 15 from the controller 40, in order from the top.

The sensor signal turns on in a case where the sensor 14 detects an object to be detected, and the sensor signal turns off in a case where the sensor 14 does not detect the object to be detected (hereinafter, a state where the sensor signal is turned on, and the sensor 14 detects an object to be detected is referred to as a "detection state", and a state where the sensor signal is turned off, and the sensor 14 does not detect the object to be detected is referred to as a "non-detection state"). Additionally, the driving signal of the second solenoid valve 28 is equivalent to an opening/closing state of the second solenoid valve 28, the driving signal of the first solenoid valve 25 is equivalent to an opening/closing state of the first solenoid valve 25, the driving signal of the electrolysis tank 37 is equivalent to on/off of the electrolysis tank 37 (in other words, an operation/non-operation state of the electrolysis tank 37), and the driving signal of the LED 15 is equivalent to an on/off state of the LED 15.

First, at time t11, the sensor signal is switched from off to on, that is, the sensor 14 is switched from a non-detection state to a detection state. At this time, the controller 40 energizes the first solenoid valve 25 to open the first solenoid valve 25, and performs foamy water discharge of normal water from the first water discharge part 12. This foamy water discharge is water discharge for hand washing of a user or the like. Hereinafter, the water discharge performed in order to attain such a purpose is appropriately referred to as "water discharge for hand washing" (although this water discharge is used in order to attain not only the purpose of hand washing but also various purposes such as washing of a face, storing of water in the bowl 3, and washing of teeth brushing, word "water discharge for hand washing" is used by applying hand washing as the representative for convenience sake for distinction from after-water discharge described below). Then, at time t12, the sensor signal is switched from on to off, that is, the sensor 14 is switched from the detection state to the non-detection state. At this time, the controller 40 stops energization to the first solenoid valve 25 to close the first solenoid valve 25, and the foamy water discharge from the first water discharge part 12 is terminated, that is, the water discharge for hand washing is terminated.

Thereafter, when the non-detection state of the sensor 14 is continued for a predetermined time T1 from the time t12 when the foamy water discharge as the water discharge for hand washing is terminated, the controller 40 causes spray water discharge from the second water discharge part 13. This spray water discharge is performed in order to prevent dirt flowing out by hand washing using the above water discharge for hand washing from being unlikely to be removed by being dried and stuck in a state of being adhered to the bowl 3 and the like of the hand wash basin 5 (hereinafter, water discharge for such a purpose is appropriately referred to as "after-water discharge" as water discharge performed after the water discharge for hand washing). That is, after the predetermined time T1 elapses from termination of the water discharge for hand washing, spray water discharge is performed as the after-water discharge, and dirt is washed away before the dirt by the water discharge for hand washing is dried and stuck. From such a viewpoint, the predetermined time T1 is set based on time until the dirt by the water discharge for hand washing is dried and stuck. For example, the predetermined time T1 is set to three seconds.

More specifically, the controller 40 first informs a user that spray water discharge is performed from now on, by turning on the LED 15 and irradiating the water discharge range R11 of the spray water discharge by the second water discharge part 13 with light of the LED 15, at time t13 (refer to FIG. 4). Then, the controller 40 energizes the second solenoid valve 28 to open the second solenoid valve 28 at time t14 (corresponding to time after the predetermined time T1 elapses from the time t12 when the water discharge for hand washing is terminated) immediately after the time t13, and energizes the electrolysis tank 37 to generate electrolyzed water in the electrolysis tank 37 at time t15 immediately after the time t14, so that electrolyzed water is sprayed from the second water discharge part 13, that is, after-water discharge is performed. Thus, the reason why energization of the second solenoid valve 28 and energization of the electrolysis tank 37 are not performed at the same time, and energization to the electrolysis tank 37 is started after start of the energization of the second solenoid valve 28 is because, since large power is consumed at timing of switching of the second solenoid valve 28 from closing to opening, and therefore the electrolysis tank 37 is not energized at this switching timing, and the electrolysis tank 37 tries to be energized while power is stable.

Thereafter, at time t16 when a predetermined time T3 (for example, 1.9 seconds) elapses from the time t14 when the second solenoid valve 28 is opened, the controller 40 stops energization to the electrolysis tank 37 to terminate the generation of electrolyzed water in the electrolysis tank 37. At this time, the second solenoid valve 28 is still opened, and therefore the spray water discharge from the second water discharge part 13 is continued. Then, at time t17 after the time t16, more specifically, at the time t17 when a predetermined time T2 (for example, 3.5 seconds) elapses from the time t14 when the second solenoid valve 28 is opened, the controller 40 turns the LED 15 off to terminate irradiation of light from the LED 15, and stops energization to the second solenoid valve 28 to close the second solenoid valve 28, so that the spray water discharge from the second water discharge part 13 is terminated, that is, the after-water discharge is terminated.

Herein, life (lifetime) of the electrolysis tank 37 may be increased, and control related to the above after-water discharge may be performed.

In one example, the controller 40 does not perform the after-water discharge each time the water discharge for hand washing is performed, but performs the after-water discharge each time the water discharge for hand washing is performed a predetermined number of times. More specifically, the controller 40 counts the number of times of the water discharge for hand washing, and the controller 40 does not perform the after-water discharge when the counted number of times does not reach the predetermined number of times, but performs the after-water discharge when the counted number of times reaches the predetermined number of times. At this time, the number of times counted at this time is reset, and the number of times of the water discharge for hand washing is counted again. In this case, the controller 40 applies electrolyzed water when the after-water discharge is performed.

In another example, the controller 40 performs the after-water discharge each time the water discharge for hand washing is performed, but appropriately switches between after-water discharge which applies electrolyzed water, and after-water discharge which does not apply electrolyzed water (that is, after-water discharge which applies normal water). In this case, the controller 40 applies electrolyzed water each time the after-water discharge is performed the predetermined number of times. More specifically, the controller 40 counts the number of times of the after-water discharge. When the number of times counted does not reach the predetermined number of times, the electrolysis tank 37 is not energized, so that after-water discharge which applies normal water is performed. When the counted number of times reaches the predetermined number of times, the electrolysis tank 37 is energized, so that after-water discharge which applies electrolyzed water is performed. At this time, the counted number of times is reset, and the number of times of the after-water discharge is counted again.

In yet another example, the controller 40 performs the after-water discharge each time the water discharge for hand washing is performed, and performs the after-water discharge by changing energization time of the electrolysis tank 37. That is, in a case where the after-water discharge is performed, the controller 40 changes the concentration of electrolyzed water to be applied. More specifically, use frequency of the automatic water faucet device 1 is learned, the controller 40 adjusts energizing time of the electrolysis tank 37 based on this use frequency. More specifically, the controller 40 reduces the energizing time of the electrolysis tank 37, as the learned use frequency is high. In other words, the controller 40 increases the energizing time of the electrolysis tank 37, as the learned use frequency is low.

In the above description, control related to the after-water discharge performed in consideration of the life (lifetime) of the electrolysis tank 37 is described. However, the present invention is not limited to such control, and control related to the after-water discharge may be performed while giving a priority to keeping the bowl 3 of the hand wash basin 5 clean. In this case, the bowl 3 of the hand wash basin 5 becomes dirty after the user washes his/her hands, and therefore the controller 40 may perform the after-water discharge which applies electrolyzed water each time the water discharge for hand washing is performed.

Now, the reason why electrolyzed water is generated only in an initial period (period denoted by a reference numeral T3 in FIG. 7) in a period when the after-water discharge is performed (period denoted by a reference numeral T2 in FIG. 7), and normal water made to be flow without generating electrolyzed water in a period subsequent the above period will be described with reference to FIGS. 8A-8E. FIG. 8A-8E schematically illustrate the second flow path 18 and the second water discharge part 13 on the upstream side of the electrolysis tank 37, and illustrates a state of water inside the second flow path 18 in the period when the after-water discharge is performed in time series from the left to the right. FIGS. 8A-8E illustrate normal water and electrolyzed water inside the second flow path 18 by different forms.

First, when the after-water discharge is started, the controller 40 switches the second solenoid valve 28 from closing to opening to start energization to the electrolysis tank 37. At this time, the inside of the second flow path 18 is filled with normal water, and therefore normal water is discharged from the second water discharge part 13 (refer to FIG. 8A). Thereafter, electrolyzed water generated in the electrolysis tank 37 flows through the second flow path 18 toward the downstream side (refer to FIG. 8B). When the electrolyzed water reaches the downstream end of the second flow path 18, that is, reaches the second water discharge part 13 (at this time, the inside of the second flow path 18 is filled with the electrolyzed water), the electrolyzed water starts being discharged from the second water discharge part 13 (refer to FIG. 8C). Thereafter, the controller 40 stops the energization of the electrolysis tank 37 to stop the generation of the electrolyzed water in the electrolysis tank 37, while maintaining the second solenoid valve 28 in the open state. Then, normal water is supplied to the second flow path 18 to push the electrolyzed water inside the second flow path 18 out, so that the electrolyzed water is discharged from the second water discharge part 13, and the electrolyzed water inside the second flow path 18 is gradually replaced with the normal water (refer to FIG. 8D). Then, finally, the electrolyzed water inside the second flow path 18 is nearly eliminated, the inside of the second flow path 18 is filled with the normal water (refer to FIG. 8E). At this time, the controller 40 switches the second solenoid valve 28 from opening to closing, and the spray water discharge from the second water discharge part 13 is terminated, that is, the after-water discharge is terminated.

Thus, in this embodiment, when the after-water discharge using electrolyzed water is terminated, the inside of the second flow path 18 is filled with normal water. Thus, corrosion (degradation) of the second flow path 18 and the like due to electrolyzed water remaining in the second flow path 18 is inhibited. In this case, the controller 40 stops the energization of the electrolysis tank 37, and thereafter maintains the second solenoid valve 28 in the open state for time required for allowing the same quantity of normal water as the capacity (capacity including the second water discharge part 13 may be used) of the second flow path 18, or the larger quantity of normal water than the above quantity to flow in the second flow path 18, and supplies normal water to the second flow path 18, so that the state where the inside of the second flow path 18 is filled with normal water is created at the time of termination of the after-water discharge.

In one example, in a case where the capacity of the second flow path 18 is 8 cc, and the flow rate in the second flow path 18 is 5 cc/sec., 1.6 seconds are required to fill the inside of the second flow path 18 with normal water, and therefore the controller 40 stops the energization of the electrolysis tank 37, and thereafter maintains the second solenoid valve 28 in the open state for 1.6 seconds, and supplies normal water to the second flow path 18. In this example, in a case where the after-water discharge is performed for 3.5 seconds (equivalent to the predetermined time T2 illustrated in FIG. 7), the controller 40 energizes the electrolysis tank 37 while keeping the second solenoid valve 28 in the open state for the first 1.9 seconds (equivalent to the predetermined time T3 illustrated in FIG. 7), and thereafter maintains the second solenoid valve 28 in the open state while stopping the energization of the electrolysis tank 37 for 1.6 seconds. In such a case, normal water is discharged for the first initial 1.6 seconds, and thereafter electrolyzed water is discharged for 1.9 seconds.

In the above example, 1.6 seconds are minimum time required for filling the inside of the second flow path 18 with normal water from the stop of the energization of the electrolysis tank 37. The present invention is not limited to the maintenance of opening of the second solenoid valve 28 and the supply of normal water to the second flow path 18 for 1.6 seconds, and the second solenoid valve 28 may be maintained in the open state and normal water may be supplied to the second flow path 18 for time longer than 1.6 seconds. This is equivalent to supply of the larger quantity of normal water than the capacity of the second flow path 18 to the second flow path 18. In this case, after electrolyzed water is discharged, and thereafter normal water is discharged for a while, electrolyzed water discharged to the bowl 3 and the like of the hand wash basin 5 can be allowed to flow by the normal water, so that it is possible to inhibit influence of electrolyzed water on the bowl 3, a perforated plate, and the like.

In the above example, in the after-water discharge, electrolyzed water is discharged from the second water discharge part 13, and thereafter the energization of the electrolysis tank 37 is stopped, supply of electrolyzed water to the second flow path 18 is stopped, and normal water is supplied to the second flow path 18. In another example, electrolyzed water may be discharged from the second water discharge part 13, and thereafter the energization of the electrolysis tank 37 may not be stopped, energization power (which means a current or a voltage) of the electrolysis tank 37 may be lowered, and not normal water but electrolyzed water having low concentration may be supplied to the second flow path 18.

In this case, the controller 40 first applies first energization power to the electrolysis tank 37, so that electrolyzed water having first concentration is generated in the electrolysis tank 37, this electrolyzed water having the first concentration is discharged from the second water discharge part 13 through the second flow path 18. Thereafter, second energization power lower than the first energization power is applied to the electrolysis tank 37, so that electrolyzed water having second concentration lower than the first concentration is generated in the electrolysis tank 37, and this electrolyzed water having the second concentration is supplied to the second flow path 18. For example, as the electrolyzed water having the first concentration, electrolyzed water with concentration having a sufficient disinfecting function is applied, and as the electrolyzed water having the second concentration, electrolyzed water having small concentration hardly giving influence on the second flow path 18 and the like (preferably, electrolyzed water having such concentration that the electrolyzed water having the first concentration filled in the second flow path 18 can be sufficiently diluted) is applied. When the second energization power applied to the electrolysis tank 37 is 0, the energization of the electrolysis tank 37 is stopped, and the second concentration becomes 0, so that normal water is supplied to the second flow path 18 like the above example.

Also in such another example, the electrolyzed water having the relatively high first concentration is discharged, and thereafter the electrolyzed water having the relatively low second concentration is supplied to the second flow path 18, and therefore the concentration of electrolyzed water inside the second flow path 18 can be diluted by this electrolyzed water having the second concentration, and it is possible to inhibit corrosion (degradation) of the second flow path 18 and the like due to electrolyzed water.

Now, another control example performed on the basis of the above basic control (refer to FIG. 7) in the first embodiment of the present invention will be described with reference to FIG. 9 to FIG. 11.

Figure 9:
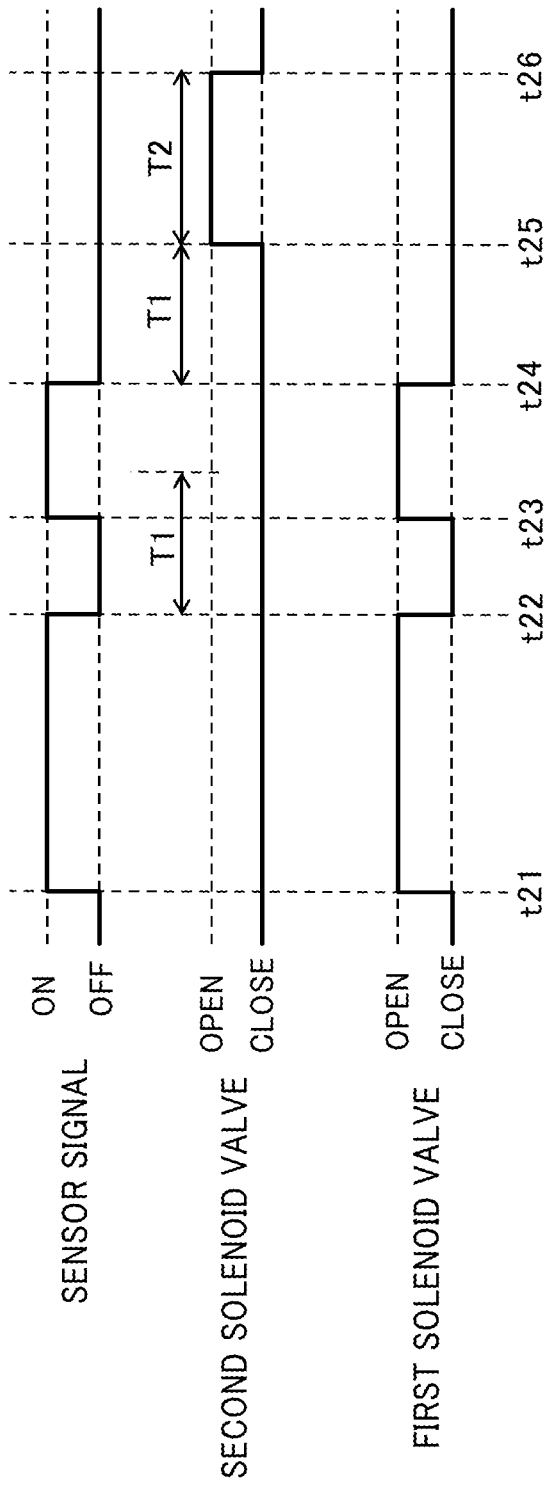
FIG. 9 is a time chart illustrating a first control example according to the first embodiment of the present invention.

FIG. 9 is a time chart illustrating a first control example according to the first embodiment of the present invention. FIG. 9 illustrates a sensor signal supplied to the controller 40 from the sensor 14, a driving signal supplied to the second solenoid valve 28 from the controller 40, and a driving signal supplied to the first solenoid valve 25 from the controller 40, in order from the top.

Herein, description of control similar to the above basic control will be appropriately omitted. More specifically, control from time t21 to time t22, and control subsequent to time t24 are similar to the basic control, and therefore description thereof will be omitted, and only control from the time t22 to the time t24 will be described.

The above basic control is control for performing the after-water discharge when the predetermined time T1 elapses after execution of the water discharge for hand washing. However, the first control example is related to control performed in a case where the sensor 14 is switched from a non-detection state to a detection state during time before the predetermined time T1 elapses from execution of the water discharge for hand washing. More specifically, in the first control example, after the time t22 when the water discharge for hand washing is terminated, at time t23 before the predetermined time T1 elapses, the sensor 14 is switched from the non-detection state to the detection state, so that the controller 40 energizes the first solenoid valve 25 to open the first solenoid valve 25, and discharges foamy water from the first water discharge part 12. In this case, the controller 40 maintains the first solenoid valve 25 in the open state between the time t23 and the time t24 during which the detection state of the sensor 14 is continued, and performs foamy water discharge by the first water discharge part 12, that is, performs the water discharge for hand washing.

Thus, in the first control example, in a case where the sensor 14 is brought into the detection state in a period before the after-water discharge is performed after execution of the water discharge for hand washing, spray water discharge by the second water discharge part 13 is not performed, and foamy water discharge by the first water discharge part 12 is performed. Thus, in a case where the sensor 14 is switched from the temporal non-detection state to the detection state after execution of the water discharge for hand washing (for example, in a case where a user temporarily moves his/her hands outside the detection range of the sensor 14 during hand wash), the after-water discharge is not started, and the water discharge for hand washing is started again. That is, the user can start washing hands again without waiting for termination of the after-water discharge.

Figure 10:
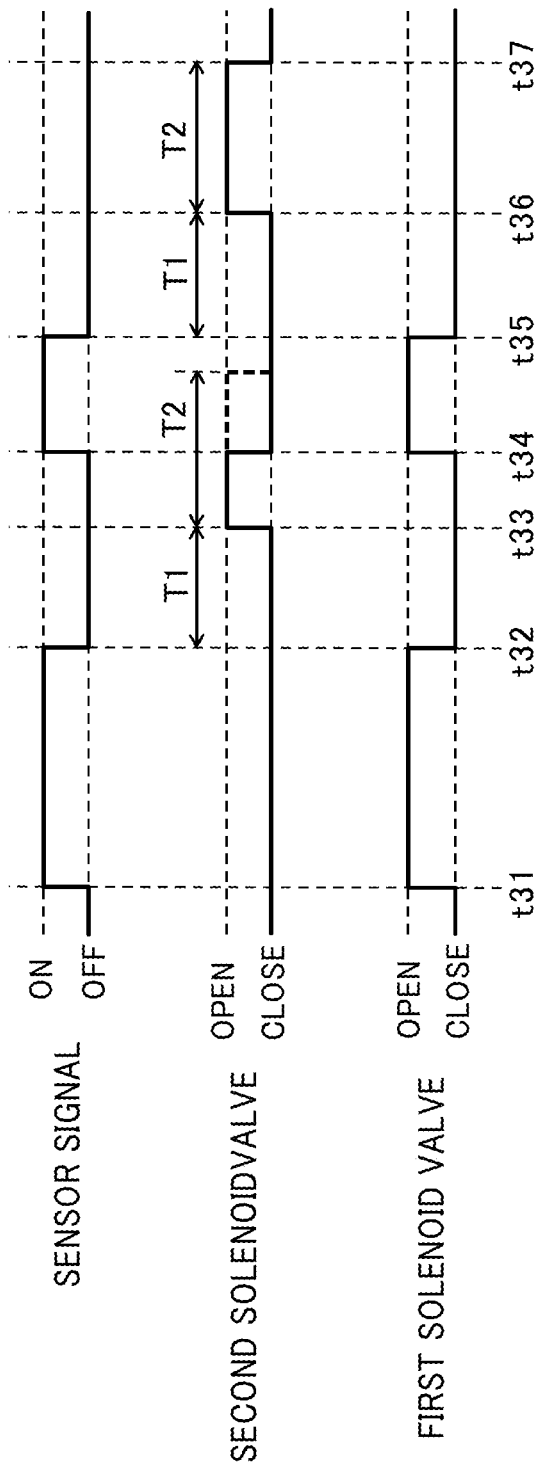
FIG. 10 is a time chart illustrating a second control example according to the first embodiment of the present invention.

FIG. 10 is a time chart illustrating a second control example according to the first embodiment of the present invention. FIG. 10 illustrates a sensor signal supplied to the controller 40 from the sensor 14, a driving signal supplied to the second solenoid valve 28 from the controller 40, and a driving signal supplied to the first solenoid valve 25 from the controller 40, in order from the top.

Herein, description of control similar to the above basic control will be appropriately omitted. More specifically, control from time t31 to time t33, and control subsequent to time t35 are similar to the basic control, and therefore description thereof will be omitted, and only control from the time t34 to the time t35 will be described.

The second control example is related to control performed in a case where the sensor 14 is switched from the non-detection state to the detection state during execution of the after-water discharge. More specifically, in the second control example, the sensor 14 is switched from the non-detection state to the detection state at the time t34 during execution of the after-water discharge, so that the controller 40 stops energization to the second solenoid valve 28 to close the second solenoid valve 28 (stops also energization of the electrolysis tank 37 in a case where the electrolysis tank 37 is energized), stops spray water discharge from the second water discharge part 13, energizes the first solenoid valve 25 to open the first solenoid valve 25, and performs foamy water discharge from the first water discharge part 12. That is, the controller 40 terminates the after-water discharge to start the water discharge for hand washing. In this case, the controller 40 maintains the first solenoid valve 25 in the open state between the time t34 and the time t35 during which the detection state of the sensor 14 is continued, and performs foamy water discharge by the first water discharge part 12. Then, at time t36 when the non-detection state of the sensor 14 is continued for the predetermined time T1 after the time t35 when the water discharge for hand washing is terminated, the controller 40 energizes the second solenoid valve 28 to open the second solenoid valve 28, performs spray water discharge by the second water discharge part 13, that is, performs the after-water discharge again.

Thus, in the second control example, in a case where the sensor 14 is brought into the detection state during the execution of the after-water discharge, the spray water discharge by the second water discharge part 13 is stopped, and foamy water discharge by the first water discharge part 12 is performed, that is, the after-water discharge is stopped and the water discharge for hand washing is performed. Thus, a user can wash his/her hands without waiting for termination of the after-water discharge. Additionally, when electrolyzed water falls on the hands of the user, skin roughness is sometimes caused depending on the concentration of electrolyzed water, or odor peculiar to electrolyzed water (such as odor of chlorine) sometimes remains. However, in case where the sensor 14 is brought into the detection state during execution of the after-water discharge, the after-water discharge is stopped, so that such a problem caused by falling of electrolyzed water on the hands of the user is prevented.

Figure 11:
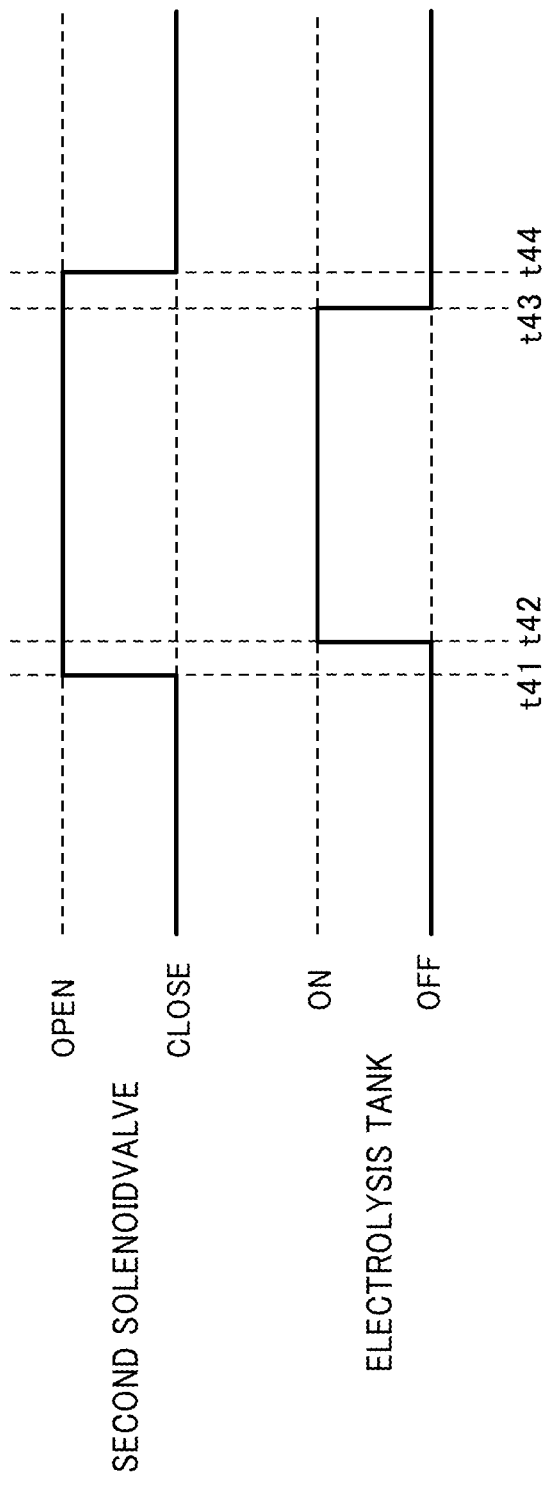
FIG. 11 is a time chart illustrating a third control example according to the first embodiment of the present invention.

FIG. 11 is a time chart illustrating a third control example according to the first embodiment of the present invention. FIG. 11 illustrates a driving signal supplied to the second solenoid valve 28 from the controller 40 on the top, and a driving signal supplied to the electrolysis tank 37 from the controller 40 on the bottom. Herein, description of control similar to the above basic control will be appropriately omitted.

In the above basic control, the energization of the second solenoid valve 28 and the energization of the electrolysis tank 37 are not performed at the same time, and the energization of the electrolysis tank 37 is started after start of the energization of the second solenoid valve 28. However, in the third control example, the controller 40 does not stop the energization of the second solenoid valve 28 and the energization of the electrolysis tank 37 at the same time, and stops the energization of the second solenoid valve 28 after start of the energization of the electrolysis tank 37. More specifically, the controller 40 energizes the second solenoid valve 28 at time t41, and energizes the electrolysis tank 37 at time t42 immediately after that, and thereafter stops the energization of the electrolysis tank 37 at time t43, and stops the energization of the second solenoid valve 28 at time t44 immediately after that. For example, in a case where the sensor 14 is brought into the detection state during execution of the after-water discharge where electrolyzed water is being generated, the controller 40 stops the energization of the electrolysis tank 37 and the energization of the second solenoid valve 28 by such a procedure.

Thus, the reason why the stop of the energization of the second solenoid valve 28 and the stop of the energization of the electrolysis tank 37 are not performed at the same time, and the energization to the second solenoid valve 28 is stopped after the stop of the energization of the electrolysis tank 37 is because, since large power is consumed at timing of switching of the second solenoid valve 28 from opening to closing, and therefore the electrolysis tank 37 already stops the energization of the electrolysis tank 37 at this switching timing, and the second solenoid valve 28 tries to be operated while power is stable. In the period during which both the second solenoid valve 28 and the electrolysis tank 37 are energized (period between the time t42 and the time t43), large power is consumed, and therefore power supplied to the second solenoid valve 28 may be appropriately thinned out. More specifically, the energization to the second solenoid valve 28 may be stopped temporarily. Even when the energization to the second solenoid valve 28 is temporarily stopped after the second solenoid valve 28 is once opened, the second solenoid valve 28 is hardly closed, so that it is possible to maintain the substantially open state of the second solenoid valve 28.

Figure 12:
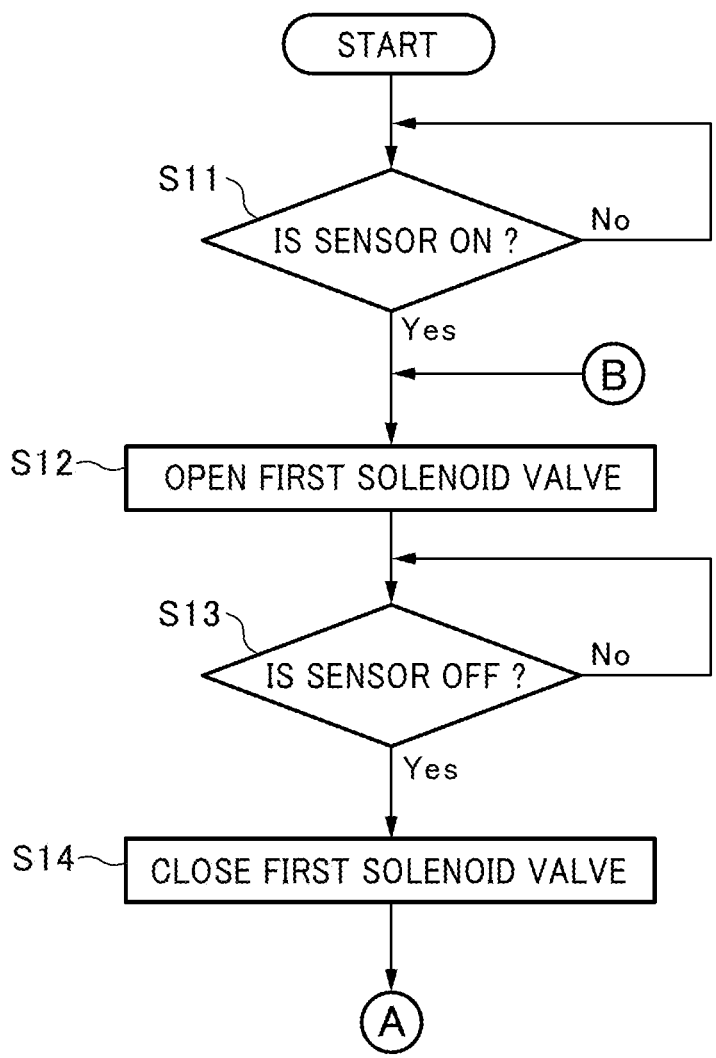
FIG. 12 is a flowchart illustrating a control flow of water discharge for hand washing according to the first embodiment of the present invention.
Figure 13:
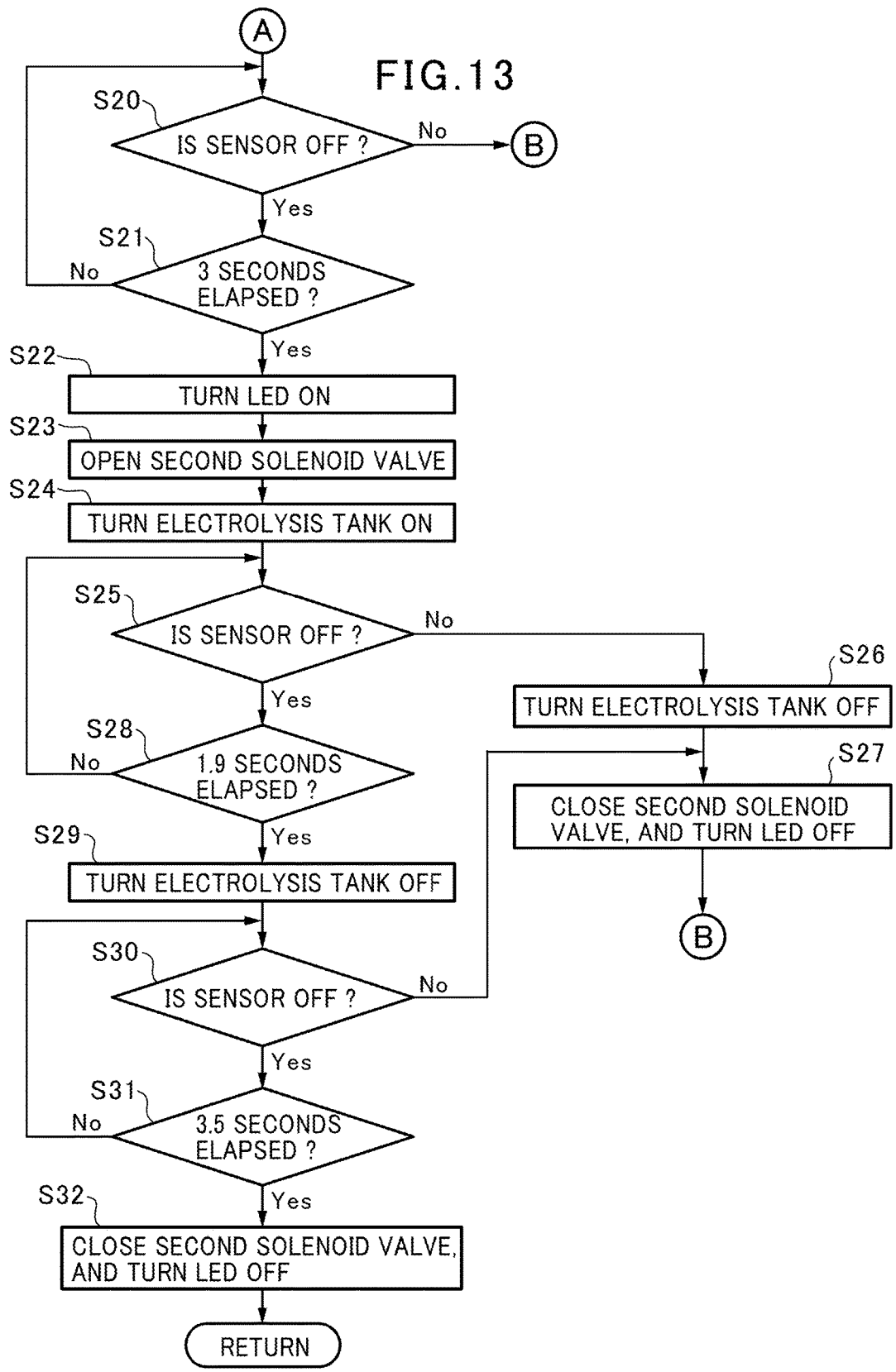
FIG. 13 is a flowchart illustrating a control flow of after-water discharge according to the first embodiment of the present invention, the control flow being performed after the flowchart illustrated in FIG. 12.

Now, a control flow performed by the controller 40 in the first embodiment of the present invention will be described with reference to FIG. 12 and FIG. 13. FIG. 12 is a flowchart illustrating a control flow of water discharge for hand washing according to the first embodiment of the present invention, and FIG. 13 is a flowchart illustrating a control flow of the after-water discharge according to the first embodiment of the present invention, the control flow being performed after the flowchart illustrated in FIG. 12. The control flows illustrated in FIG. 12 and FIG. 13 are control flows obtained by applying the first to third control examples (refer to FIG. 9 to FIG. 11) to the basic control (refer to FIG. 7).

First, the control flow according to water discharge for hand washing according to the first embodiment of the present invention, illustrated in FIG. 12 will be described.

First, in Step S11, the controller 40 determines whether or not a sensor signal from the sensor 14 is switched from off to on, that is, determines whether or not the sensor 14 is switched from the non-detection state to the detection state. As a result, in a case where the sensor signal is not switched from off to on (Step S11: No), the determination in Step S11 is performed again. That is, the controller 40 repeatedly performs the determination in Step S11 until the sensor signal is switched from off to on.

On the other hand, in a case where the sensor signal is switched from off to on, (Step S11: Yes), the process advances to Step S12, the controller 40 energizes the first solenoid valve 25 to open the first solenoid valve 25, and performs foamy water discharge of normal water from the first water discharge part 12, that is, performs the water discharge for hand washing.

Then, the process advances to Step S13, the controller 40 determines whether or not the sensor signal from the sensor 14 is switched from on to off, that is, determines whether or not the sensor 14 is switched from the detection state to the non-detection state. As a result, in a case where the sensor signal is not switched from on to off (Step S13: No), the determination in Step S13 is performed again. That is, the controller 40 repeatedly performs the determination in Step S13 until the sensor signal is switched from on to off. In this case, the controller 40 continues the energization to the first solenoid valve 25, and maintains the open state of the first solenoid valve 25, so that water discharge for hand washing is continued.

On the other hand, in a case where the sensor signal is switched from on to off (Step S13: Yes), the process advances to Step S14, the controller 40 stops the energization to the first solenoid valve 25 to open the first solenoid valve 25, and terminates the foamy water discharge from the first water discharge part 12, that is, terminates the water discharge for hand washing. Thereafter, the process advances to Step S20 illustrated in FIG. 13.

Now, the control flow of the after-water discharge according to the first embodiment of the present invention, illustrated in FIG. 13 will be described.

First, in Step S20, the controller 40 determines whether or not a sensor signal from the sensor 14 is off, that is, determines whether or not the sensor 14 is in the non-detection state. As a result, in a case where the sensor signal is not off (Step S20: No), that is, in a case where the sensor signal is switched from off to on, the process returns to Step S12 illustrated in FIG. 12. In this case, as described above, the controller 40 energizes the first solenoid valve 25 to open the first solenoid valve 25, performs foamy water discharge of normal water from the first water discharge part 12, and performs the water discharge for hand washing again.

On the other hand, in a case where the sensor signal is off (Step S20: Yes), the process advances to Step S21, and the controller 40 determines whether or not 3 seconds (equivalent to the predetermined time T1 illustrated in FIG. 7) elapses from the termination of the water discharge for hand washing. As a result, in a case where 3 seconds do not elapse from the termination of the water discharge for hand washing (Step S21: No), the process returns to Step S20, determination in Steps S20 and S21 is performed again. In this case, while determining whether or not the sensor signal is off, the controller 40 waits for elapse of 3 seconds.

On the other hand, in a case where 3 seconds elapse from the termination of the water discharge for hand washing (Step S21: Yes), the process advances to Step S22, and the controller 40 turns the LED 15 on. Immediately after that, in Step S23, the controller 40 energizes the second solenoid valve 28 to open the second solenoid valve 28. Immediately after that, in Step S24, the controller 40 energizes the electrolysis tank 37 to generate electrolyzed water in the electrolysis tank 37. Thus, the controller 40 performs spray water discharge of electrolyzed water from the second water discharge part 13, that is, performs the after-water discharge.

Strictly, at a time point before 3 seconds elapse from the termination of the water discharge for hand washing, that is, when a predetermined time of less than 3 seconds elapse from the termination of the water discharge for hand washing, the controller 40 turns the LED 15 on so as to open the second solenoid valve 28 at a point when 3 seconds elapse from the termination of the water discharge for hand washing.

Then, in Step S25, the controller 40 determines whether or not the sensor signal from the sensor 14 is off, that is, determines whether or not the sensor 14 is in the non-detection state. As a result, in a case where the sensor signal is not off (Step S25: No), that is, the sensor signal is switched from off to on, the process advances to Step S26. In this case, in Step S26, the controller 40 stops the energization of the electrolysis tank 37, and terminates the generation of electrolyzed water in the electrolysis tank 37. Immediately after that, in Step S27, the controller 40 turns the LED 15 off, stops the energization to the second solenoid valve 28, and opens the second solenoid valve 28. Thus, the controller 40 terminates the spray water discharge from second water discharge part 13, that is, terminates the after-water discharge. Thereafter, the process returns to Step S12 illustrated in FIG. 12, and the controller 40 energizes the first solenoid valve 25 to open the first solenoid valve 25, performs foamy water discharge of normal water from the first water discharge part 12, and performs the water discharge for hand washing again, as described above.

On the other hand, in a case where the sensor signal is off (Step S25: Yes), the process advances to Step S28, and the controller 40 determines whether or not 1.9 seconds (equivalent to the predetermined time T3 illustrated in FIG. 7) elapse from the start of the after-water discharge. As a result, in a case where 1.9 seconds do not elapse from the start of the after-water discharge (Step S28: No), the process returns to Step S25, determination in Steps S25 and S28 is performed again. In this case, while determining whether or not the sensor signal is off, the controller 40 waits for elapse of 1.9 seconds.

On the other hand, in a case where 1.9 seconds elapse from the start of the after-water discharge (Step S28: Yes), the process advances to Step S29, and the controller 40 stops the energization of the electrolysis tank 37 to terminate the generation of electrolyzed water in the electrolysis tank 37.

Then, in Step S30, the controller 40 determines whether or not the sensor signal from the sensor 14 is off, that is, determines whether or not the sensor 14 is in the non-detection state. As a result, in a case where the sensor signal is not off (Step S30: No), that is, the sensor signal is switched from off to on, the process advances to Step S27. In this case, in Step S27, the controller 40 turns the LED 15 off, stops the energization to the second solenoid valve 28, and closes the second solenoid valve 28. Thus, the controller 40 terminates the spray water discharge from second water discharge part 13, that is, terminates the after-water discharge. Thereafter, the process returns to Step S12 illustrated in FIG. 12, and the controller 40 energizes the first solenoid valve 25 to open the first solenoid valve 25, performs foamy water discharge of normal water from the first water discharge part 12, and performs the water discharge for hand washing again, as described above.

On the other hand, in a case where the sensor signal is off (Step S30: Yes), the process advances to Step S31, and the controller 40 determines whether or not 3.5 seconds (equivalent to the predetermined time T2 illustrated in FIG. 7) elapses from the start of the after-water discharge. As a result, in a case where 3.5 seconds do not elapse from the start of the after-water discharge (Step S31: No), the process returns to Step S30, determination in Steps S30 and S31 is performed again. In this case, while determining whether or not the sensor signal is off, the controller 40 waits for elapse of 3.5 seconds.

On the other hand, in a case where 3.5 seconds elapse from the start of the after-water discharge (Step S31: Yes), the process advances to Step S32, and the controller 40 turns the LED 15 off, stops the energization to the second solenoid valve 28 to close the second solenoid valve 28. Thus, the controller 40 terminates the spray water discharge from the second water discharge part 13, that is, terminates the after-water discharge.

Working Effects of First Embodiment

Now, working effects of the automatic water faucet device according to the first embodiment of the present invention will be described.

According to the first embodiment, in a case where the sensor 14 is in the detection state, the water discharge for hand washing is performed. When the sensor 14 is brought into the non-detection state, the water discharge for hand washing is terminated, and thereafter the after-water discharge is performed (refer to FIG. 7). Therefore, when there is a possibility that dirt flowing out by hand washing using the water discharge for hand washing is dried and stuck in the state of being adhered to the bowl 3 and the like of the hand wash basin 5, the after-water discharge can be suitably performed, and the dirt can be inhibited from being dried and stuck in the state of being adhered to the bowl 3 and the like of the hand wash basin 5, while unnecessary water discharge is inhibited. Accordingly, it is possible to keep the bowl 3 of the hand wash basin 5 and the like clean. Particularly, according to the first embodiment, the after-water discharge is performed by use of electrolyzed water, and therefore it is possible to effectively keep the bowl 3 and the like of the hand wash basin 5 clean.

Additionally, water (dirty water) flowing out by hand washing using the water discharge for hand washing tends to fall in a range wider than the water discharge range of the water discharge for hand washing. However, according to the first embodiment, the after-water discharge is performed by use of spray water discharge having wider discharge angle of water from the water discharge port than the foamy water discharge used in the water discharge for hand washing, and therefore water can be discharged in a wide range at a low flow rate, and the bowl 3 and the like of the hand wash basin 5 can be effectively kept clean while unnecessary water discharge is effectively inhibited. In this case, it is difficult for a user to anticipate the water discharge range R11 of spray water discharge. However, according to the first embodiment, the LED 15 irradiates substantially the same range R12 as the water discharge range R11 of the spray water discharge (refer to FIG. 4), and therefore the user can be suitably informed of the water discharge range R11 of the spray water discharge, and water can be inhibited from reaching a place where the user does not desire. Particularly, according to the first embodiment, before the spray water discharge is started, the user is previously informed of the water discharge range R11 of the spray water discharge by light from the LED 15 (refer to FIG. 7), and therefore water can be effectively inhibited from reaching the place where the user does not desire.

According to the first embodiment, when the non-detection state of the sensor 14 is continued for a predetermined time after the water discharge for hand washing is terminated, the after-water discharge is performed (refer to FIG. 7), and therefore the user can be informed of the termination of the water discharge for hand washing and start of subsequent after-water discharge. When electrolyzed water by the after-water discharge falls on the hands of the user, skin roughness is sometimes caused depending on the concentration of electrolyzed water, or odor peculiar to electrolyzed water (such as odor of chlorine) sometimes remains. However, the user is thus informed of the start of the after-water discharge, so that it is possible to suitably prevent a problem caused by falling of electrolyzed water on the hands of the user.

According to the first embodiment, in a case where the sensor 14 is brought into the detection state during time before the after-water discharge is performed after execution of the water discharge for hand washing, spray water discharge is not performed, and foamy water discharge is performed (refer to FIG. 9). Therefore, in a case where the sensor is switched from the temporal non-detection state to the detection state after the water discharge for hand washing (for example, in a case where the user temporarily moves his/her hands outside the detection range of the sensor 14 during hand washing), the after-water discharge is not started, and the water discharge for hand washing can be suitably started again. That is, the user can start washing hands again without waiting for termination of the after-water discharge.

According to the first embodiment, in a case where the sensor 14 is brought into the detection state during after-water discharge, the spray water discharge is stopped, and the foamy water discharge is performed, that is, the after-water discharge is stopped, and the water discharge for hand washing is performed (refer to FIG. 10), and therefore the user can wash his/her hand without waiting for the termination of the after-water discharge, and the above problem caused by falling of electrolyzed water on the hands of the user can be prevented.

According to the first embodiment, the electrolysis tank 37 starts being energized after energization of the second solenoid valve 28, and the energization of the electrolysis tank 37 is started in a state where power is stable when the after-water discharge is started, and the second solenoid valve 28 stops being energized after the stop of the energization of the electrolysis tank 37, and the second solenoid valve 28 is operated from opening to closing in a state where power is stable (refer to FIG. 11) when the after-water discharge is terminated, and therefore it is possible to suitably handle a power supply having small capacity, and miniaturization of the device is possible.

According to the first embodiment, the after-water discharge is not performed each time the water discharge for hand washing is performed, but the after-water discharge is performed each time the water discharge for hand washing is performed the predetermined number of times, or use frequency of the automatic water faucet device 1 is learned, energizing time of the electrolysis tank 37 is adjusted on the basis of this use frequency, so that it is possible to reduce load applied to the electrolysis tank 37 to increase the life (lifetime) of the electrolysis tank 37.

Furthermore, according to the first embodiment, in the after-water discharge, electrolyzed water is discharged from the second water discharge part 13, and thereafter the energization of the electrolysis tank 37 is stopped, supply of the electrolyzed water to the second flow path 18 is stopped, and normal water is supplied to the second flow path 18 (refer to FIG. 7 and FIGS. 8A-8E), and therefore the electrolyzed water inside the second flow path 18 is discharged by this supplied normal water to be replaced by the normal water, so that the concentration of the electrolyzed water inside the second flow path 18 can be diluted (in a case where sufficient quantity of the normal water is supplied, almost all the electrolyzed water inside the second flow path 18 is discharged, and the inside of the second flow path 18 can be filled with the normal water). Consequently, corrosion (degradation) of the second flow path 18 or the like due to electrolyzed water remaining in the second flow path 18 can be inhibited. Herein, a method for regulating the concentration of electrolyzed water is considered in order to inhibit the corrosion of the second flow path 18 or the like. In this case, the concentration of electrolyzed water needs to be regulated to such concentration as to inhibit corrosion. However, according to the first embodiment, as described above, normal water is supplied to the second flow path 18, and therefore it is possible to apply electrolyzed water with various concentration without considering the corrosion of the second flow path 18 or the like.

On the other hand, according to the first embodiment, in the automatic water faucet device 1 provided with the first water discharge port 12a of the first water discharge part 12, the second water discharge port 13a of the second water discharge part 13, and the sensor 14 in the front end, the first water discharge port 12a is disposed between the sensor 14 and the second water discharge port 13a (refer to FIG. 2B), and therefore the sensor 14 can be separated from the second water discharge port 13a, and it is possible to inhibit erroneous water discharge due to detection of water sprayed from the second water discharge port 13a by the sensor 14. Particularly, according to the first embodiment, the LED 15 is further disposed between the first water discharge port 12a and the second water discharge port 13a (refer to FIG. 2B), and therefore the sensor 14 can be further separated from the second water discharge port 13a, and it is possible to effectively inhibit the above erroneous water discharge. In addition, the LED 15 is disposed near the second water discharge port 13a, and therefore the water discharge range R11 of the second water discharge part 13 can be suitably irradiated with light from the LED 15.

According to the first embodiment, the sensor 14 is disposed in front of the second water discharge port 13a (refer to FIG. 2B), and therefore a user does not need to force himself/herself to stretch his/her hands rearward in order to make the sensor 14 detect his/her hands, compared to a case where the sensor 14 is disposed behind the second water discharge port 13a. In addition, the second water discharge port 13a is disposed behind the sensor 14 (refer to FIG. 2B), and therefore water sprayed from the second water discharge port 13a is unlikely to fall on a part not desired to be wet such as an arm and a body of the user, compared to a case where the second water discharge port 13a is disposed in front of the sensor 14.

According to the first embodiment, the sensor 14 is disposed so as to be directed in such a direction that the detection direction A23 of the sensor 14 is separated from the water discharge direction A22 of the second water discharge part 13, in other words, the sensor 14 is disposed such that the line L13 along the detection direction A23 of the sensor 14 does not intersect with the line L12 vertically extending from the center of the second water discharge port 13a of the second water discharge part 13 on the front side (refer to FIG. 5), and therefore intersects with the water discharge range R11 of the second water discharge part 13 at a part where detection accuracy in the directional range R13 of the sensor 14 is considerably low (that is, part considerably separated from the sensor 14 in the directional range R13), so that it is possible to effectively inhibit erroneous water discharge due to detection of the water sprayed from the second water discharge port 13a by the sensor 14.

According to the first embodiment, the first water discharge part 12 and the second water discharge part 13 are disposed so as to be directed in such a direction that the water discharge direction A21 of the first water discharge part 12 and the water discharge direction A22 of the second water discharge part 13 are separated from each other, in other words, the first water discharge part 12 and the second water discharge part 13 are disposed such that the line L11 vertically extending from the center of the first water discharge port 12a does not intersect with the line L12 vertically extending from the center of the second water discharge port 13a on the front side (refer to FIG. 5), and therefore the spray water discharge can be performed downward from the second water discharge part 13, and water sprayed from the second water discharge part 13 can be suitably prevented from falling on the user.

According to the first embodiment, the second water discharge port 13a is disposed behind the first water discharge port 12a (refer to FIG. 2B), and therefore water dripping from the first water discharge port 12a is suitably prevented from falling on the second water discharge port 13a. In this case, according to the first embodiment, the direction of the second water discharge part 13, taking the position of the first water discharge port 12a into consideration, is applied, so that water sprayed from the second water discharge port 13a is suitably prevented from falling on the first water discharge port 12a.

Second Embodiment

Now, control performed by the controller 40 in a second embodiment of the present invention will be described. In the above first embodiment, in the water discharge for hand washing, only the foamy water discharge from the first water discharge part 12 is performed. However, in the second embodiment, in the water discharge for hand washing, only the foamy water discharge from a first water discharge part 12 is performed, but also spray water discharge from a second water discharge part 13 is performed. More specifically, in the second embodiment, in water discharge for hand washing, a controller 40 first performs spray water discharge from the second water discharge part 13 for a predetermined time, and thereafter performs foamy water discharge from the first water discharge part 12.

Hereinafter, description of control similar to the control of the above first embodiment will be appropriately omitted, and only control different from the control of the first embodiment will be described. That is, control which is not particularly described is similar to the control of the first embodiment.

Figure 14:
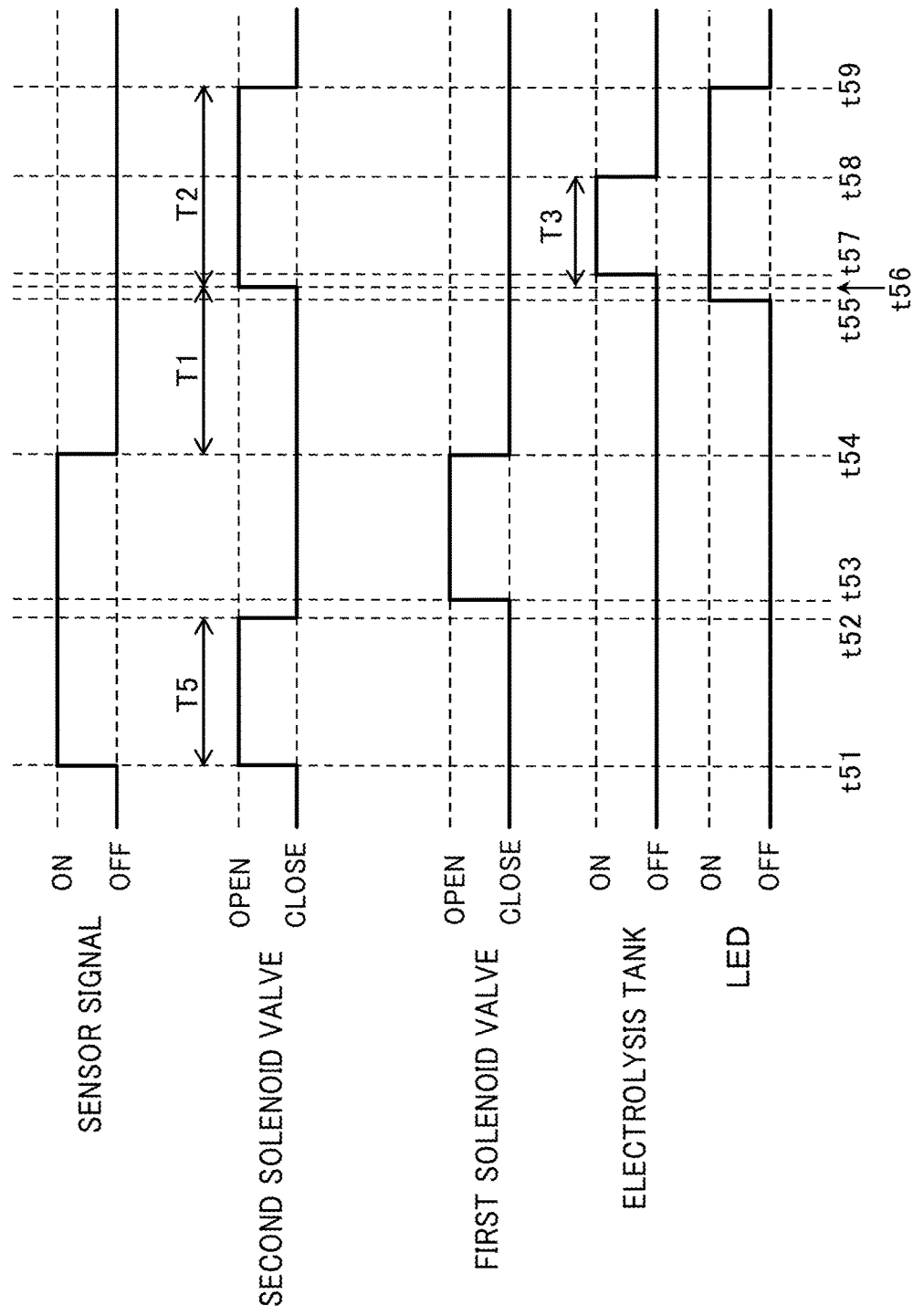
FIG. 14 is a time chart illustrating basic control according to a second embodiment of the present invention.

FIG. 14 is a time chart illustrating basic control according to the second embodiment of the present invention. FIG. 14 illustrates a sensor signal supplied to the controller 40 from the sensor 14, a driving signal supplied to a second solenoid valve 28 from the controller 40, a driving signal supplied to a first solenoid valve 25 from the controller 40, a driving signal supplied to an electrolysis tank 37 from the controller 40, and a driving signal supplied to an LED 15 from the controller 40, in order from the top.

Herein, control subsequent to time t54 is similar to the control of the basic control, and therefore description thereof will be omitted, and only control from time t51 to the time t54 will be described.

First, at the time t51, the sensor signal is switched from off to on, that is, the sensor 14 is switched from a non-detection state to a detection state. At this time, the controller 40 energizes the second solenoid valve 28 to open the second solenoid valve 28, and performs spray water discharge from the second water discharge part 13. In this case, the controller 40 does not turn the LED 15 on, and does not energize the electrolysis tank 37, that is, does not generate electrolyzed water in the electrolysis tank 37, and sprays normal water from the second water discharge part 13. The controller 40 applies such spray water discharge as water discharge initially performed in water discharge for hand washing. Then, the controller 40 stops the energization to the second solenoid valve 28 to close the second solenoid valve 28 at time t52 when a predetermined time T5 (for example, 3 seconds) elapses from the time t51 when the spray water discharge from the second water discharge part 13 is started, so that the spray water discharge from the second water discharge part 13 is terminated.

Then, at time t53 when a certain time (for example, 0.5 seconds) elapses from the time t52 when the spray water discharge from the second water discharge part 13 is terminated, the controller 40 energizes the first solenoid valve 25 to open the first solenoid valve 25, and sprays normal water from the first water discharge part 12. The controller 40 applies such foamy water discharge as water discharge performed after the spray water discharge in the water discharge for hand washing. Thereafter, at the time t54, the sensor signal is switched from on to off, that is, the sensor 14 is switched from the detection state to the non-detection state. At this time, the controller 40 stops the energization to the first solenoid valve 25 to close the first solenoid valve 25, and terminates the foamy water discharge from the first water discharge part 12. Thus, the water discharge for hand washing is terminated. Thereafter, the controller 40 performs after-water discharge in a procedure similar to the procedure of the first embodiment.

The predetermined time T5 for performing the spray water discharge in the water discharge for hand washing may be able to be regulated. More specifically, a regulation unit such as a switch may be provided in an automatic water faucet device 1, a manager or the like may be able to regulate the predetermined time T5 by using the regulation unit in response to usage environment of the automatic water faucet device 1 (such as a characteristic of a user of the automatic water faucet device 1, and an installation place of the automatic water faucet device 1).

Figure 15:
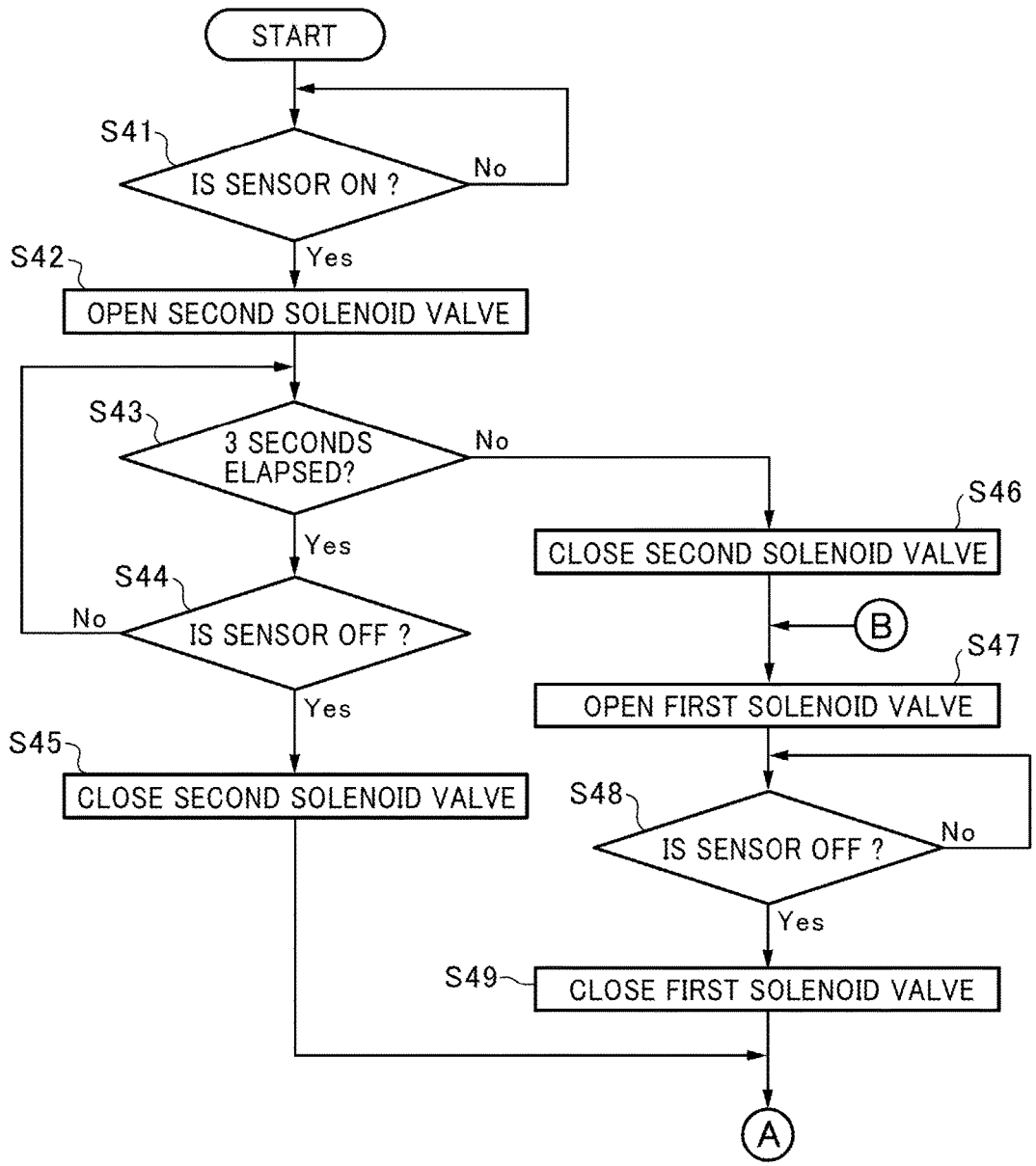
FIG. 15 is a flowchart illustrating a control flow of water discharge for hand washing according to the second embodiment of the present invention.

Now, a control flow performed by the controller 40 in the second embodiment of the present invention will be described with reference to FIG. 15. FIG. 15 is a flowchart illustrating a control flow of water discharge for hand washing according to the second embodiment of the present invention.

Also after termination of the control flow according to the water discharge for hand washing according to the second embodiment, the above control flow according to after-water discharge illustrated in FIG. 13 is similarly performed.

First, in Step S41, the controller 40 determines whether or not a sensor signal from the sensor 14 is switched from off to on, that is, determines whether or not the sensor 14 is switched from the non-detection state to the detection state. As a result, in a case where the sensor signal is not switched from off to on (Step S41: No), the determination in Step S41 is performed again. That is, the controller 40 repeatedly performs the determination in Step S41 until the sensor signal is switched from off to on.

On the other hand, in a case where the sensor signal is switched from off to on, (Step S41: Yes), the process advances to Step S42, and the controller 40 energizes the second solenoid valve 28 to open the second solenoid valve 28, and performs foamy water discharge from the second water discharge part 13. Thus, the water discharge for hand washing is started.

Then, the process advances to Step S43, the controller 40 determines whether or not 3 seconds (equivalent to the predetermined time T5 illustrated in FIG. 14) elapses from the start of the spray water discharge as the water discharge for hand washing. As a result, in a case where 3 seconds do not elapse from the start of the spray water discharge (Step S43: Yes), the process advances to Step S44, the controller 40 determines whether or not the sensor signal from the sensor 14 is switched from on to off, that is, determines whether or not the sensor 14 is switched from the detection state to the non-detection state. As a result, in a case where the sensor signal is switched from on to off (Step S44: Yes), the process advances to Step S45, the controller 40 stops the energization to the second solenoid valve 28 to close the second solenoid valve 28, and terminates the spray water discharge from the second water discharge part 13. Consequently, the water discharge for hand washing is terminated. Thereafter, the process advances to Step S20 illustrated in FIG. 13, which is described above.

On the other hand, in a case where the sensor signal is not switched from on to off (Step S44: No), the process returns to Step S43, and determination in Steps S43 and S44 is performed again. That is, while determining whether or not the sensor signal is switched from on to off, the controller 40 waits for elapse of 3 seconds. In this case, the controller 40 continues the energization to the second solenoid valve 28, and maintains the open state of the second solenoid valve 28, so that spray water discharge from the second water discharge part 13 is continued.

On the other hand, in a case where 3 seconds elapse from the start of the spray water discharge (Step S43: No), the process advances to Step S46, and the controller 40 stops the energization to the second solenoid valve 28 to close the second solenoid valve 28, and terminates the spray water discharge from the second water discharge part 13.

Then, the process advances to Step S47, and the controller 40 energizes the first solenoid valve 25 to open the first solenoid valve 25, and starts the foamy water discharge from the first water discharge part 12. In this case, the controller 40 starts such foamy water discharge after the predetermined time (for example, 0.5 seconds) elapses from the termination of the spray water discharge.

Then, the process advances to Step S48, the controller 40 determines whether or not the sensor signal from the sensor 14 is switched from on to off, that is, determines whether or not the sensor 14 is switched from the detection state to the non-detection state. As a result, in a case where the sensor signal is not switched from on to off (Step S48: No), the determination in Step S48 is performed again. That is, the controller 40 repeatedly performs the determination in Step S48 until the sensor signal is switched from on to off. In this case, the controller 40 continues the energization to the first solenoid valve 25, and maintains the open state of the first solenoid valve 25, so that foamy water discharge from the first water discharge part 12 is continued.

On the other hand, in a case where the sensor signal is switched from on to off (Step S48: Yes), the process advances to Step S49, and the controller 40 stops the energization to the first solenoid valve 25 to close the first solenoid valve 25, and terminates the foamy water discharge from the first water discharge part 12. Consequently, the water discharge for hand washing is terminated. Thereafter, the process advances to Step S20 illustrated in FIG. 13, which is described above.

In a case where the control flow according to the second embodiment is executed, when the determination in the above Step S20 illustrated in FIG. 13 is "No", and after the control in Step S27 is performed, the process returns to Step S47 illustrated in FIG. 15. More specifically, also in the second embodiment, in a case where the sensor 14 is brought into the detection state during time before the after-water discharge is performed after execution of the water discharge for hand washing, spray water discharge by the second water discharge part 13 is not performed, and foamy water discharge by the first water discharge part 12 is performed. Additionally, in a case where the sensor 14 is brought into the detection state during after-water discharge, the spray water discharge by the second water discharge part 13 is stopped, and the foamy water discharge by the first water discharge part 12 is performed.

Working Effects of Second Embodiment

Now, working effects of the automatic water faucet device according to the second embodiment of the present invention will be described. Herein, only working effects different from the above working effects of the first embodiment will be described.

According to the second embodiment, while the sensor 14 detects an object to be detected, the spray water discharge from the second water discharge part 13 is first performed. Then, when the predetermined time T5 (for example, 3 seconds) elapses from the start of the spray water discharge, the spray water discharge is stopped, and the foamy water discharge from the first water discharge part 12 is performed. Therefore, it is possible to efficiently perform hand washing by first using spray water discharge at a low flow rate and at a high flow speed, and it is possible to efficiently perform not only hand washing but also face washing, water storage, and the like by using foamy water discharge at a high flow rate after the spray water discharge. Therefore, it is possible to suitably save water while securing convenience of a user. Particularly, according to the second embodiment, switching to the foamy water discharge from the spray water discharge is automatically performed, and therefore the switching to the foamy water discharge is automatically performed without special operation or attention by the user, for example, in a case where operation other than hand washing (such as face washing and water storage) is performed, or in a case where relatively long operation such as hand washing using a soap is performed, so that high convenience is secured.

According to the second embodiment, after a constant time (for example, after 0.5 seconds) from the stop of the spray water discharge from the second water discharge part 13, the foamy water discharge from the first water discharge part 12 is started, that is, water is temporarily stopped between the spray water discharge and the foamy water discharge, and therefore the user can be informed of the termination of the spray water discharge. Consequently, it is possible to give the user an opportunity for stopping hand washing, and it is possible to effectively save water.

According to the second embodiment, the predetermined time T5 for performing the spray water discharge in the water discharge for hand washing can be changed, and therefore the predetermined time T5 for performing the spray water discharge can be appropriately regulated depending on priority of either convenience of the user or water saving in accordance with the usage environment of the automatic water faucet device 1. For example, in environment where stuck dirt is adhered to a hand, and relatively long hand washing is needed, the predetermined time T5 for performing the spray water discharge is shortened, and it is possible to give priority to the convenience of the use over water saving.

According to the second embodiment, in a case where the sensor 14 detects an object to be detected during time before the predetermined time T1 (for example, 3 seconds) elapses after the sensor 14 does not detect the object to be detected, and the water discharge for hand washing is stopped, the spray water discharge from the second water discharge part 13 is not performed again, and the foamy water discharge from the first water discharge part 12 is performed, and therefore the convenience of the user can be suitably secured. For example, in a case where the user moves his/her hands to the outside of the detection range of the sensor 14 during hand washing, and thereafter tries to draw water with his/her hands, or wash hands with a soap, not the spray water discharge but the foamy water discharge is performed, and therefore it is possible to secure the convenience of the user.
<Modifications>

Now, modifications of the above embodiments will be described. The modifications described below can be applied by being appropriately combined with the above embodiments.
(Modification 1)

In the above embodiments, the foamy water discharge is performed from the first water discharge part 12, that is, the foamy water discharge is described as the first water discharge form in the present invention. However, the first water discharge form in the present invention is not limited to application of the foamy water discharge. As the first water discharge form in the present invention, various water discharge forms such as a shower water discharge form in which water is discharged in a shower form from a large number of water discharge ports each having a small diameter, a straight water discharge form (strictly, the foamy water discharge illustrated in the above embodiments includes this straight water discharge) in which water is discharged straight from one or more water discharge ports each having a relatively large diameter, a water discharge form in which the foamy water discharge and the shower water discharge are combined can be applied.

The present invention is not limited to difference in a form for discharging fluid from a water discharge part (such as the foamy water discharge and the spray water discharge) between the first water discharge form and the second water discharge form, and difference in the kind of fluid discharged from the water discharge part may be employed in place of the difference in the form for discharging fluid from the water discharge part. For example, as the first water discharge form, a water discharge form in which normal water is discharged from a water discharge part is applied, and as the second water discharge form, a water discharge form in which electrolyzed water is discharged from a water discharge part may be applied. Alternatively, as the first water discharge form, the water discharge form in which electrolyzed water is discharged from a water discharge part may be applied, and as the second water discharge form, the water discharge in which normal water is discharged from a water discharge part may be applied. In addition, the water discharge form in which electrolyzed water is discharged from a water discharge part may be applied to both the first water discharge form and the second water discharge form, and the concentration of electrolyzed water applied to the first water discharge form, and the concentration of electrolyzed water applied to the second water discharge form may be made to be different from each other.

Additionally, the form for discharging fluid from the water discharge part (such as the foamy water discharge and the spray water discharge) may be different between the first water discharge form and the second water discharge form, and the kind of fluid (such as normal water and electrolyzed water) discharged from the water discharge part may be different between the first water discharge form and the second water discharge form.

In a case of applying such a modification, the following example of the water discharge form is considered. In a first example, spray water discharge of normal water can be performed in water discharge for hand washing, and spray water discharge of electrolyzed water can be performed in after-water discharge. In a second example, foamy water discharge of normal water can be performed in water discharge for hand washing, and foamy water discharge of electrolyzed water can be performed in after-water discharge. In a third example, spray water discharge of electrolyzed water can be performed, and thereafter foamy water discharge of normal water is performed in water discharge for hand washing, and spray water discharge of electrolyzed water can be performed in after-water discharge. In the second embodiment, spray water discharge of normal water is performed, and thereafter foamy water discharge of normal water is performed in water discharge for hand washing, and spray water discharge of electrolyzed water is performed in after-water discharge.
(Modification 2)

In the above embodiments, the after-water discharge is performed by use of electrolyzed water. However, the after-water discharge may be used by use of normal water without use of electrolyzed water. In this case, the electrolysis tank 37 may not be provided on the second flow path 18. Such after-water discharge using normal water can prevent dirt flowing out by hand washing from being dried and stuck in a state of being adhered to the bowl 3 and the like of the hand wash basin 5.

(Modification 3)

In the above embodiment, the water discharge from the first water discharge part 12 and the water discharge from the second water discharge part 13 are switched by use of the two solenoid valves, namely, the first solenoid valve 25 and the second solenoid valve 28. However, the water discharge from the first water discharge part 12 and the water discharge from the second water discharge part 13 may be switched by only one solenoid valve.

Figure 16:
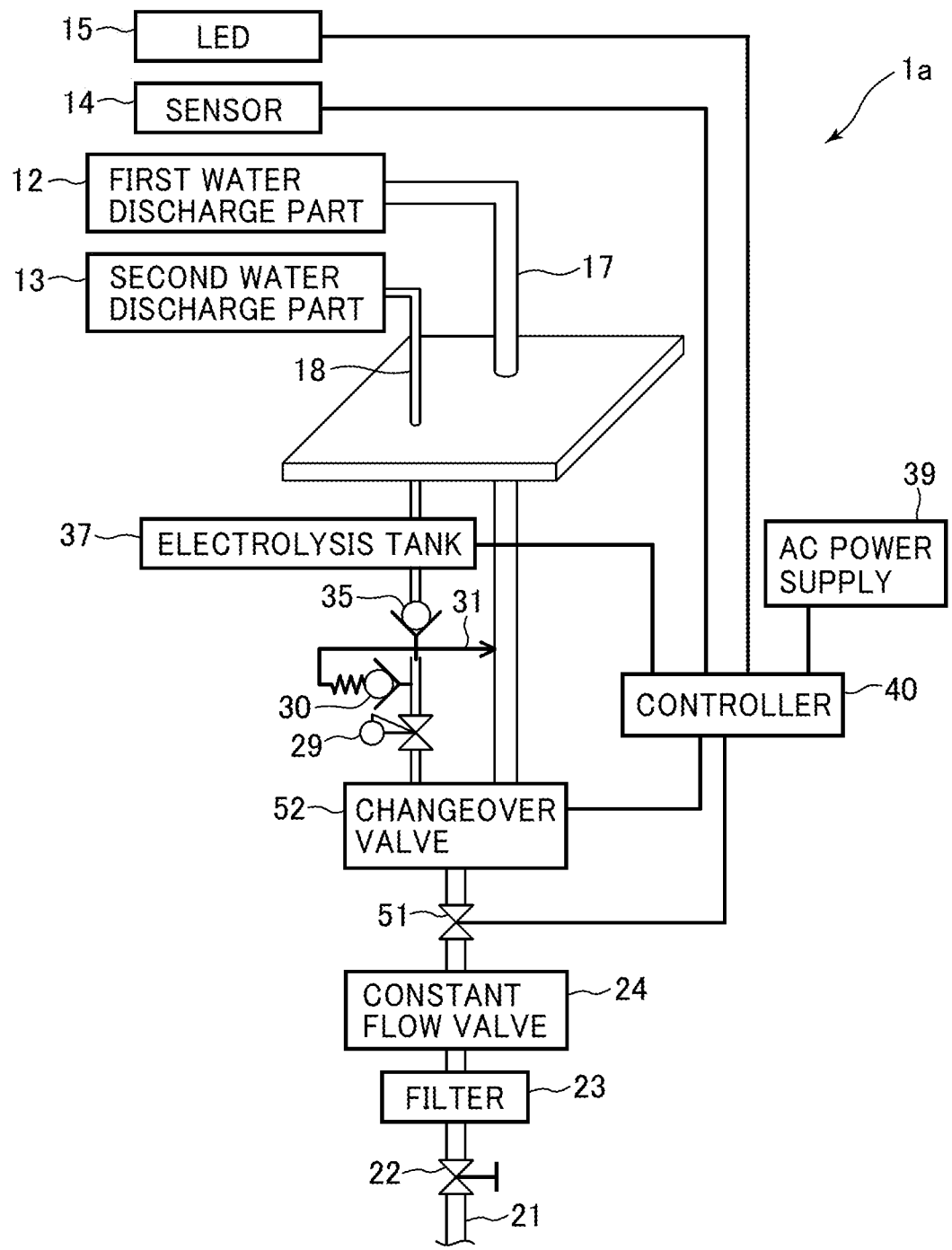
FIG. 16 is a block diagram schematically illustrating a function configuration of an automatic water faucet device according to Modification 3 in the embodiments of the present invention.

A function configuration of an automatic water faucet device using only one solenoid valve according to Modification 3 in the embodiments of the present invention will be described with reference to FIG. 16. FIG. 16 is a block diagram schematically illustrating the function configuration of the automatic water faucet device according to Modification 3 of the embodiment of the present invention. Herein, components identical with the components of the automatic water faucet device 1 illustrated in FIG. 6 are denoted by the same reference numerals, and description thereof will be omitted.

As illustrated in FIG. 16, a configuration of an automatic water faucet device 1a according to Modification 3 is different from the configuration of the automatic water faucet device 1 illustrated in FIG. 6 in that a solenoid valve 51 and a changeover valve 52 are provided in place of the first solenoid valve 25 and the second solenoid valve 28. The solenoid valve 51 is provided on a common flow path 21, and is opened and closed by control from a controller 40 to switch between circulation and blocking of normal water in the common flow path 21. The changeover valve 52 is provided at a connection part between the common flow path 21 and the first flow path 17 and between the common flow path 21 and the second flow path 18. In other words, the changeover valve 52 is provided at a branch part of a downstream end of the common flow path 21. The changeover valve 52 is operated by control from the controller 40 to switch a flow path for allowing normal water to flow to either one of the first flow path 17 and the second flow path 18.

The changeover valve 52 is configured as an electric valve controlled by the controller 40. However, a mechanical valve driven by water pressure may be applied as the changeover valve in place of such a changeover valve 52. In a case where a mechanical changeover valve is applied, the flow path for allowing normal water to flow may be switched between the first flow path 17 and the second flow path 18 by regulating the opening of the solenoid valve 51 provided on the common flow path 21 on an upstream side of this changeover valve, and regulating water pressure applied to the changeover valve.

(Modification 4)

In the above embodiments, the after-water discharge is performed after the predetermined time elapses after the stop of the water discharge for hand washing (refer to FIG. 7, FIG. 14, and the like). In another example, the after-water discharge may be provided without providing time after the stop of the water discharge for hand washing, that is, the after-water discharge may be performed continuously with the water discharge for hand washing.

In yet another example, the after-water discharge may be started during execution of water discharge for hand washing, and the after-water discharge may be overlapped with the water discharge for hand washing. In this case, the water discharge for hand washing is performed while the sensor 14 is in a detection state, and when the sensor 14 is switched from the detection state to a non-detection state, after-water discharge is started while the water discharge for hand washing is continued, and timing of termination of the water discharge for hand washing and timing of start of the after-water discharge may be overlapped. However, it is assumed that the water discharge for hand washing is stopped before the after-water discharge. In other words, it is assumed that the after-water discharge is stopped after the stop of the water discharge for hand washing.

(Modification 5)

In the automatic water faucet device 1 of each of the above embodiments, water is discharged from the two water discharge parts (the first water discharge part 12 and the second water discharge part 13) by use of the two flow paths (the first flow path 17 and the second flow path 18) in the two types of forms (foamy water discharge and spray water discharge). More specifically, in the first embodiment, as the water discharge for hand washing, foamy water discharge is performed from the first water discharge part 12 through the first flow path 17, and as the after-water discharge, spray water discharge is performed from the second water discharge part 13 through the second flow path 18 (refer to FIG. 7 and the like). In another example, both water discharge for hand washing and after-water discharge may be performed by use of only one flow path and one water discharge part in one type of water discharge form. More specifically, in another example, both water discharge for hand washing and after-water discharge are performed by use of only a water discharge part capable of performing spray water discharge by this spray water discharge.

Figure 17A:
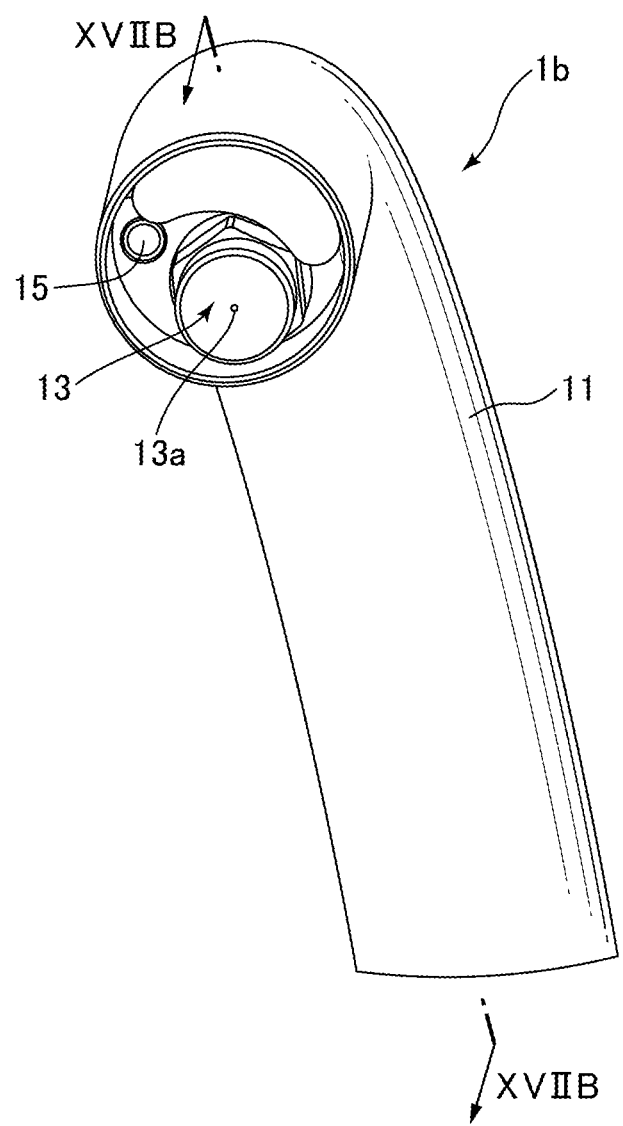

A configuration of an automatic water faucet device according to Modification 5 in the embodiments of the present invention, which performs both water discharge for hand washing and after-water discharge by only spray water discharge, will be described with reference to FIGS. 17A and 17B. FIG. 17A is a perspective view of the automatic water faucet device according to Modification 5 in the embodiments of the present invention, as viewed obliquely from below, and FIG. 17B is a sectional view of this automatic water faucet device taken along the line XVIIB-XVIIB in FIG. 17A.

Hereinafter, components (refer to FIGS. 2A and 2B) identical with the components of the automatic water faucet device 1 according to the above embodiments are denoted by the same reference numerals, and description thereof will be appropriately omitted. That is, components which are not particularly described are similar to the components of the automatic water faucet device 1.

As illustrated in FIGS. 17A and 17B, a configuration of an automatic water faucet device 1b according to Modification 5 is different from the configuration of the automatic water faucet device 1 according to the above embodiments in that the first water discharge part 12 and the first flow path 17 for performing foamy water discharge are not provided, but only a second water discharge part 13 and a second flow path 18 for performing spray water discharge are provided. Other configuration is almost the same as the configuration of the automatic water faucet device 1 according to the embodiments. More specifically, the automatic water faucet device 1b according to Modification 5 also has a sensor 14 for detecting an object to be detected, and an LED 15 for applying light, similarly to the automatic water faucet device 1 according to the embodiments.

In the automatic water faucet device 1b according to Modification 5, the reason why the word "second" is added to the "second water discharge part 13" and the "second flow path 18" is because existence of "first" water discharge part and flow path is not presupposed, and the second water discharge part 13 and the second flow path 18 have configurations similar to the second water discharge part 13 and the second flow path 18 of the automatic water faucet device 1 according to the above embodiments.

Figure 18:
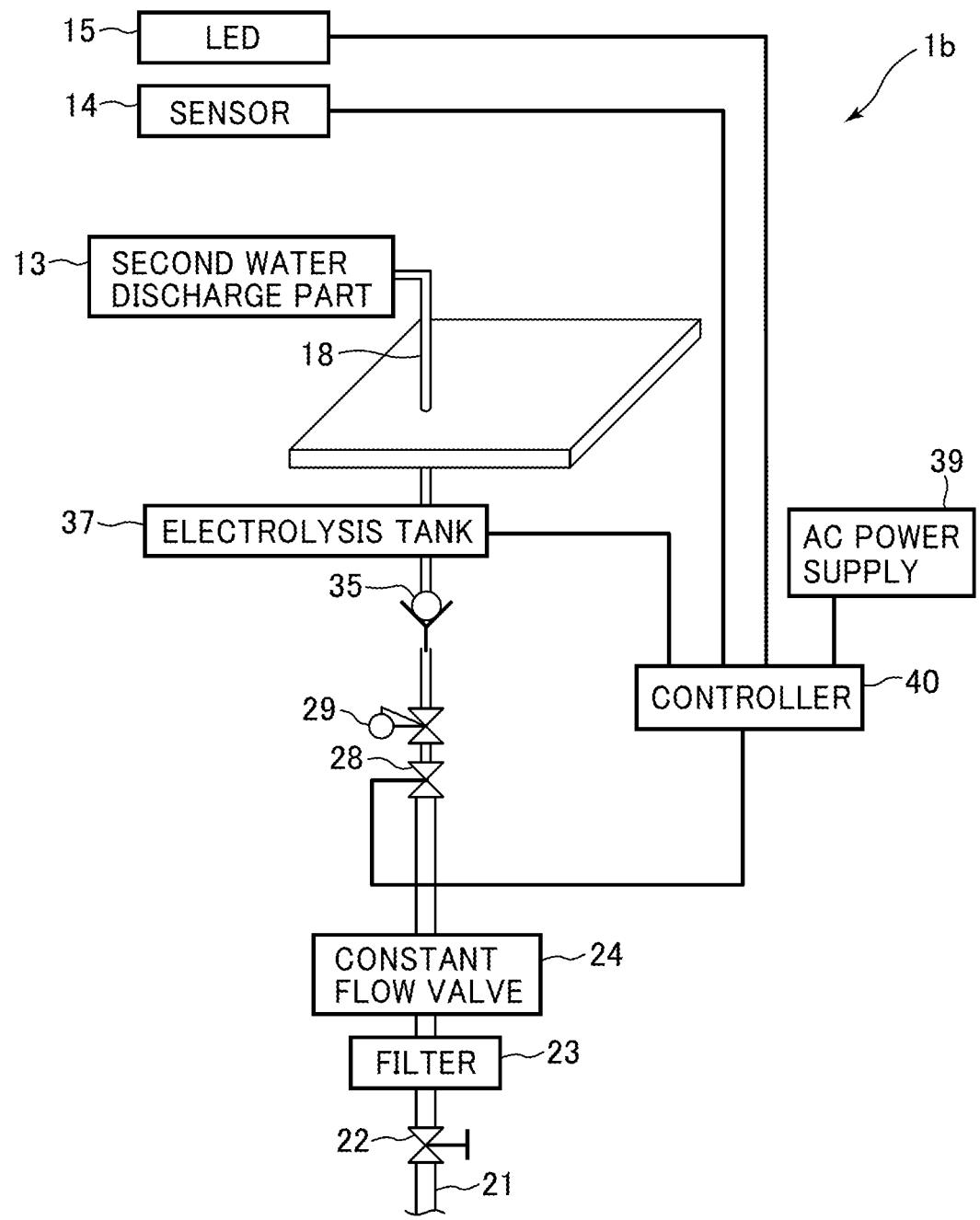
FIG. 18 is a block diagram schematically illustrating a function configuration of the automatic water faucet device according to Modification 5 in the embodiments of the present invention.

Now, a function configuration of the automatic water faucet device 1b according to Modification 5 in the embodiments of the present invention will be described with reference to FIG. 18. FIG. 18 is a block diagram schematically illustrating the function configuration of the automatic water faucet device 1b according to Modification 5 in the embodiments of the present invention. Herein, components identical with the components of the automatic water faucet device 1 illustrated in FIG. 6 are denoted by the same reference numerals, and description thereof will be omitted.

As illustrated in FIG. 18, the configuration of the automatic water faucet device 1b according to Modification 5 is different from the configuration of the automatic water faucet device 1 according to the above embodiments in that the first water discharge part 12, the first flow path 17, and the first solenoid valve 25 are not provided. In the automatic water faucet device 1b according to Modification 5, a controller 40 controls opening and closing of a second solenoid valve 28 (the reason of the addition of the word "second" is as above), so that on/off of spray water discharge from the second water discharge part 13 through the second flow path 18 is switched.

Now, control according to Modification 5 in the embodiments of the present invention will be described with reference to FIG. 19. FIG. 19 is a time chart illustrating control according to Modification 5 in the embodiments of the present invention. FIG. 19 illustrates a sensor signal supplied to the controller 40 from the sensor 14, a driving signal supplied to the second solenoid valve 28 from the controller 40, a driving signal supplied to an electrolysis tank 37 from the controller 40, and a driving signal supplied to the LED 15 from the controller 40, in order from the top.

First, at time t61, the sensor signal is switched from off to on, that is, the sensor 14 is switched from a non-detection state to a detection state. At this time, the controller 40 energizes the second solenoid valve 28 to open the second solenoid valve 28, and sprays normal water from the second water discharge part 13. Then, at time t62, the sensor signal is switched from on to off, that is, the sensor 14 is switched from the detection state to the non-detection state. At this time, the controller 40 stops the energization to the second solenoid valve 28 to close the second solenoid valve 28, and terminates foamy water discharge from the second water discharge part 13, that is, the water discharge for hand washing is terminated.

Thereafter, when the non-detection state of the sensor 14 is continued from a predetermined time T1 from the time t62 when the spray water discharge as the water discharge for hand washing is terminated, the controller 40 performs spray water discharge from the second water discharge part 13 again. More specifically, the controller 40 first turns the LED 15 on at time t63, at time t64 (corresponding to time after the predetermined time T1 elapses from the time t62 when the water discharge for hand washing is terminated) immediately after time t63, the controller 40 energizes the second solenoid valve 28 to open the second solenoid valve 28. Then, the controller 40 energizes the electrolysis tank 37 at time t65 immediately after the time t64 to generate electrolyzed water in the electrolysis tank 37, so that the controller 40 sprays the electrolyzed water from the second water discharge part 13, that is, performs after-water discharge.

Thereafter, at time t66 when a predetermined time T3 (for example, 1.9 seconds) elapses from the time t64 when the second solenoid valve 28 is opened, the controller 40 stops energization to the electrolysis tank 37 to terminate the generation of electrolyzed water in the electrolysis tank 37. At this time, the second solenoid valve 28 is still opened, and therefore the spray water discharge from the second water discharge part 13 is continued. Then, at time t67 after the time t66, more specifically, at the time t67 when a predetermined time T2 (for example, 3.5 seconds) elapses from the time t64 when the second solenoid valve 28 is opened, the controller 40 turns the LED 15 off to terminate irradiation of light from the LED 15, and stops energization to the second solenoid valve 28 to close the second solenoid valve 28, so that the spray water discharge from the second water discharge part 13 is terminated, that is, the after-water discharge is terminated.

Also in Modification 5 described above, in a case where the sensor 14 is in the detection state, the water discharge for hand washing is performed by spray water discharge. Then, when the sensor 14 is brought into the non-detection state, the water discharge for hand washing is terminated, and thereafter the after-water discharge is performed by spray water discharge. Therefore, when there is a possibility that dirt flowing out by hand washing using the water discharge for hand washing is dried and stuck in the state of being adhered to the bowl 3 of the hand wash basin 5 and the like, the after-water discharge can be suitably performed, and the dirt can be inhibited from being dried and stuck in the state of being adhered to the bowl 3 and the like of the hand wash basin 5, while unnecessary water discharge is inhibited. Accordingly, it is possible to keep the bowl 3 and the like of the hand wash basin 5 clean.

In the above Modification 5, the water discharge for hand washing by the spray water discharge using normal water, and the after-water discharge by the spray water discharge using electrolyzed water are performed. However, the present invention is not limited to this, and modifications other than this are considered. As a first modification, water discharge for hand washing by spray water discharge using normal water, and after-water discharge by spray water discharge using normal water may be performed. As a second modification, water discharge for hand washing by spray water discharge using electrolyzed water, and after-water discharge by spray water discharge using normal water may be performed. As a third modification, water discharge for hand washing by spray water discharge using electrolyzed water, and after-water discharge by spray water discharge using electrolyzed water may be performed. In this third modification, the concentration of electrolyzed water used in the water discharge for hand washing, and the concentration of electrolyzed water used in the after-water discharge may be different from each other.

(Modification 6)

In the above embodiments, the automatic water faucet device according to the present invention is applied to the hand wash basin 5. However, the application of the present invention is not limited to this. The automatic water faucet device according to the present invention may be applied to a kitchen or the like. In such a case, the after-water discharge is performed, so that dirt (dirty water) generated by use of the kitchen can be inhibited from being dried and stuck in the state of being adhered to a sink or the like.

REFERENCE SIGNS LIST 1 automatic water faucet device
3 bowl
5 hand wash basin
11 water discharge pipe
12 first water discharge part
12a first water discharge port
13 second water discharge part
13a second water discharge port
14 sensor
15 LED
17 first flow path
18 second flow path
21 common flow path
25 first solenoid valve
28 second solenoid valve
37 electrolysis tank
40 controller

The invention claimed is:

1. An automatic water faucet device for automatically discharging water when an object to be detected is detected, the automatic water faucet device comprising:
   a sensor configured to detect the object;
   a controller configured to perform a first water discharge while the sensor detects the object, and to perform a second water discharge while the sensor does not detect the object;
   a first water discharge part configured to discharge water in a first water discharge form;
   a second water discharge part configured to discharge water in a second water discharge form different from the first water discharge form;
   a functional water generation part configured to operate by a supplied current, and to reform water so as to generate functional water; and
   a solenoid valve configured to switch between execution and stop of water discharge from the second water discharge part, by opening and closing,
   wherein the controller is configured to perform the first water discharge while the sensor detects the object, and
   wherein, when the sensor no longer detects the object, the controller is configured to start the second water discharge, and to stop the second water discharge after stopping the first water discharge,
   wherein the controller is configured to perform water discharge from the first water discharge part as the first water discharge, and to perform water discharge from the second water discharge part as the second water discharge, and to perform control for switching between the water discharge from the first water discharge part and the water discharge from the second water discharge part,
   wherein the second water discharge part is configured to discharge the functional water generated by the functional water generation part, and
   wherein, when the water discharge from the second water discharge part is to be started, the controller is configured to control the functional water generation part and the solenoid valve such that energization of the functional water generation part is started after the solenoid valve is opened.

2. An automatic water faucet device for automatically discharging water when an object to be detected is detected, the automatic water faucet device comprising:
   a sensor configured to detect the object;
   a controller configured to perform a first water discharge while the sensor detects the object, and to perform a second water discharge while the sensor does not detect the object;
   a first water discharge part configured to discharge water in a first water discharge form;
   a second water discharge part configured to discharge water in a second water discharge form different from the first water discharge form; and
   a functional water generation part configured to operate by a supplied current, and to reform water so as to generate functional water;
   wherein the controller is configured to perform the first water discharge while the sensor detects the object,
   wherein, when the sensor no longer detects the object, the controller is configured to start the second water discharge, and to stop the second water discharge after stopping the first water discharge,
   wherein the controller is configured to perform water discharge from the first water discharge part as the first water discharge, and to perform water discharge from the second water discharge part as the second water discharge, and to perform control for switching between the water discharge from the first water discharge part and the water discharge from the second water discharge part,
   wherein the second water discharge part is configured to discharge the functional water generated by the functional water generation part, and
   wherein, when the water discharge from the second water discharge part is to be terminated, the controller is configured to close the solenoid valve after the energization of the functional water generation part is stopped.

3. An automatic water faucet device for automatically discharging water when an object to be detected is detected, the automatic water faucet device comprising:
   a sensor configured to detect the object;
   a controller configured to perform a first water discharge while the sensor detects the object, and to perform a second water discharge while the sensor does not detect the object;
   a first water discharge part configured to discharge water in a first water discharge form;
   a second water discharge part configured to discharge water in a second water discharge form different from the first water discharge form; and
   a functional water generation part configured to operate by a supplied current, and to reform water so as to generate functional water;
   wherein the controller is configured to perform the first water discharge while the sensor detects the object,
   wherein, when the sensor no longer detects the object, the controller is configured to start the second water discharge, and to stop the second water discharge after stopping the first water discharge,
   wherein the controller is configured to perform water discharge from the first water discharge part as the first water discharge, and to perform water discharge from the second water discharge part as the second water discharge, and to perform control for switching between the water discharge from the first water discharge part and the water discharge from the second water discharge part, wherein the second water discharge part is configured to discharge the functional water generated by the functional water generation part, and wherein the controller is further configured to control the functional water generation part, and to learn a use frequency of the automatic water faucet device so as to adjust energizing time of the functional water generation part on the basis of the use frequency.

4. An automatic water faucet device for automatically discharging water when an object to be detected is detected, the automatic water faucet device comprising:

a sensor configured to detect the object;

a controller configured to perform a first water discharge while the sensor detects the object, and to perform a second water discharge while the sensor does not detect the object;

a first water discharge part configured to discharge water in a first water discharge form; and a second water discharge part configured to discharge water in a second water discharge form different from the first water discharge form;

wherein the controller is configured to perform the first water discharge while the sensor detects the object, wherein, when the sensor no longer detects the object, the controller is configured to start the second water discharge, and to stop the second water discharge after stopping the first water discharge, wherein the controller is configured to perform water discharge from the first water discharge part as the first water discharge, and to perform water discharge from the second water discharge part as the second water discharge, and to perform control for switching between the water discharge from the first water discharge part and the water discharge from the second water discharge part, wherein a discharge angle of water from a water discharge port in the second water discharge form by the second water discharge part is larger than a discharge angle of water from a water discharge port in the first water discharge form by the first water discharge part, and wherein the automatic water faucet device further comprises an illumination part configured to irradiate substantially the same range as a water discharge range by the second water discharge part, with light.

5. The automatic water faucet device according to claim 4, wherein the illumination part is configured to start light irradiation before water discharge from the second water discharge part is started.

6. An automatic water faucet device for automatically discharging water when an object to be detected is detected, the automatic water faucet device comprising:

a sensor configured to detect the object;

a controller configured to perform a first water discharge while the sensor detects the object, and to perform a second water discharge while the sensor does not detect the object;

a first water discharge part configured to discharge water in a first water discharge form; and a second water discharge part configured to discharge water in a second water discharge form different from the first water discharge form, wherein the controller is configured to perform the first water discharge while the sensor detects the object, wherein, when the sensor no longer detects the object, the controller is configured to start the second water discharge, and to stop the second water discharge after stopping the first water discharge, wherein the controller is configured to perform water discharge from the first water discharge part as the first water discharge, and to perform water discharge from the second water discharge part as the second water discharge, and to perform control for switching between the water discharge from the first water discharge part and the water discharge from the second water discharge part, and wherein the automatic water faucet device comprises a base part that attaches to an installed surface, and a water discharge port of the first water discharge part and a water discharge port of the second water discharge part are provided in adjacent positions at a tip part of the automatic water faucet device located at the distal end of the device opposite the base part.

* * * * *